US012752412B2

(12) United States Patent
Yoshikane et al.

(10) Patent No.: US 12,752,412 B2
(45) Date of Patent: Oct. 6, 2026

(54) STRIKING TOOL

(71) Applicant: MAKITA CORPORATION, Anjo (JP)

(72) Inventors: Kiyonobu Yoshikane, Anjo (JP); Masanori Furusawa, Anjo (JP); Hideki Tsuji, Anjo (JP)

(73) Assignee: MAKITA CORPORATION, Anjo (JP)

( * ) Notice: Subject to any disclaimer, the term of this patent is extended or adjusted under 35 U.S.C. 154(b) by 11 days.

(21) Appl. No.: 17/842,014

(22) Filed: Jun. 16, 2022

(65) Prior Publication Data

US 2023/0027574 A1 Jan. 26, 2023

(30) Foreign Application Priority Data

Jul. 26, 2021 (JP) ................................. 2021-121976
Jul. 26, 2021 (JP) ................................. 2021-121979

(51) Int. Cl.

*B25D 17/04* (2006.01)
*B25D 17/00* (2006.01)
*B25D 17/24* (2006.01)

(52) U.S. Cl.

CPC ........... *B25D 17/043* (2013.01); *B25D 17/00* (2013.01); *B25D 17/24* (2013.01);
(Continued)

(58) Field of Classification Search

CPC ...... B25D 17/00; B25D 17/043; B25D 17/24; B25D 2216/0015; B25D 2222/57;
(Continued)

(56) References Cited

U.S. PATENT DOCUMENTS 3,559,751 A * 2/1971 Yamada .................... E02D 7/06 173/118
3,835,935 A * 9/1974 Sides .................. B25D 11/005 173/14

(Continued)

FOREIGN PATENT DOCUMENTS

CN 204123366 U 1/2015
CN 104511885 A 4/2015

(Continued)

OTHER PUBLICATIONS

U.S. Appl. No. 17/841,944, filed Jun. 16, 2022, in the name of Yoshikane et al.

(Continued)

*Primary Examiner* — Robert F Long
*Assistant Examiner* — Eduardo R Ferrero
(74) *Attorney, Agent, or Firm* — Oliff PLC

(57) ABSTRACT

A structuring technique contributes to the rationalization of dispositioning parts and operability with respect to a striking tool wherein usual operation is defined as a striking operation to the downward in a state that the striking tool is downwardly dropped by the own weight of the striking tool. A striking tool is held by a pair of handles by both hands while striking operation takes place when the striking tool drops downwardly by the own weight, a drive mechanism drives an end tool in a first direction and motor, wherein the output shaft of the motor extends in a third direction defined as a thickness direction to cross the first direction and the second direction, and a battery mounting portion is disposed at the side region of the main housing in the second direction, wherein a battery to supply electricity to the motor is mounted to the battery mounting portion.

15 Claims, 22 Drawing Sheets

(52) U.S. Cl.
CPC .. *B25D 2216/0015* (2013.01); *B25D 2222/57* (2013.01); *B25D 2250/051* (2013.01); *B25D 2250/091* (2013.01); *B25D 2250/095* (2013.01); *B25D 2250/121* (2013.01); *B25D 2250/245* (2013.01); *B25D 2250/371* (2013.01)

(58) Field of Classification Search
CPC ........ B25D 2250/051; B25D 2250/091; B25D 2250/095; B25D 2250/121; B25D 2250/245; B25D 2250/371
See application file for complete search history.

(56) References Cited

U.S. PATENT DOCUMENTS

| | | | | |
|---|---|---|---|---|
| 3,995,703 | A * | 12/1976 | Wanner | E21C 37/22 173/105 |
| 4,042,036 | A * | 8/1977 | Smith | B25C 1/06 74/125.5 |
| 4,060,138 | A * | 11/1977 | Cox | B25D 17/043 173/162.2 |
| 4,747,455 | A * | 5/1988 | Cunningham | B25C 1/06 173/124 |
| 6,154,369 | A | 11/2000 | Martinez, Jr. et al. | |
| 6,732,815 | B2 * | 5/2004 | Hanke | B25D 17/20 173/210 |
| 6,913,088 | B2 | 7/2005 | Berger | |
| 6,962,211 | B2 * | 11/2005 | Daubner | B25D 17/24 173/162.1 |
| 6,996,909 | B1 * | 2/2006 | Buck | H01M 50/204 30/DIG. 1 |
| 7,059,423 | B1 * | 6/2006 | Hoggarth | B25D 17/24 173/90 |
| 7,401,661 | B2 * | 7/2008 | Berghauser | B25D 17/24 173/76 |
| 7,461,715 | B1 * | 12/2008 | Tsai | B62K 5/025 180/208 |
| 7,472,760 | B2 | 1/2009 | Stirm et al. | |
| 7,624,815 | B2 * | 12/2009 | Friedrich | B03C 1/30 173/90 |
| 7,637,328 | B2 | 12/2009 | Sato | |
| 7,640,997 | B2 * | 1/2010 | Bram | B25D 17/043 173/162.2 |
| 7,882,900 | B2 * | 2/2011 | Borinato | B23B 45/008 173/217 |
| 8,235,136 | B2 | 8/2012 | Berger et al. | |
| 8,333,251 | B2 * | 12/2012 | Cecchin | B25D 11/005 173/113 |
| 8,342,260 | B2 * | 1/2013 | Buchenau | B25D 17/043 173/162.1 |
| 8,534,376 | B2 * | 9/2013 | Braun | B25D 11/005 173/114 |
| 8,616,301 | B2 * | 12/2013 | John | B25D 11/125 173/102 |
| 8,678,106 | B2 * | 3/2014 | Matsunaga | B25B 21/008 173/183 |
| 8,955,615 | B2 * | 2/2015 | John | B25D 17/06 173/206 |
| 8,991,675 | B2 * | 3/2015 | Liang | B25D 11/00 227/129 |
| 9,802,306 | B2 | 10/2017 | Miwa et al. | |
| 9,844,868 | B1 | 12/2017 | Abbey et al. | |
| 10,022,852 | B2 | 7/2018 | Ikuta et al. | |
| 10,618,157 | B2 | 4/2020 | Hashimoto et al. | |
| 10,814,468 | B2 * | 10/2020 | Krug | B25D 11/125 |
| 10,926,393 | B2 * | 2/2021 | Zawisza | B25F 5/02 |
| 11,274,400 | B2 | 3/2022 | Widlroither | |
| 11,739,481 | B2 * | 8/2023 | Borgers | B25D 9/265 173/117 |
| 11,759,935 | B2 * | 9/2023 | Zawisza | H01M 50/247 173/117 |
| 11,787,017 | B2 | 10/2023 | Widlroither | |
| 11,932,996 | B2 | 3/2024 | Widlroither | |
| 11,992,926 | B2 | 5/2024 | Tauber et al. | |
| 2002/0053445 | A1 * | 5/2002 | Kim | B23Q 5/28 173/217 |
| 2003/0155142 | A1 * | 8/2003 | Kikuchi | B25F 5/008 173/114 |
| 2006/0131042 | A1 * | 6/2006 | Hammerstingl | B25F 5/008 173/217 |
| 2007/0114051 | A1 | 5/2007 | Ege et al. | |
| 2008/0006420 | A1 * | 1/2008 | Berghauser | B25D 17/26 184/5 |
| 2008/0196913 | A1 * | 8/2008 | Bram | B25D 17/043 173/162.2 |
| 2009/0057006 | A1 | 3/2009 | Kishibata et al. | |
| 2009/0307875 | A1 * | 12/2009 | Nakashima | B25F 5/026 16/436 |
| 2010/0033885 | A1 | 2/2010 | Hotchkiss et al. | |
| 2013/0098647 | A1 * | 4/2013 | Martinsson | B25F 5/02 173/217 |
| 2015/0090470 | A1 | 4/2015 | Miwa et al. | |
| 2015/0151419 | A1 | 6/2015 | Bralla | |
| 2015/0266176 | A1 * | 9/2015 | Takeuchi | B25D 17/24 173/117 |
| 2015/0328760 | A1 * | 11/2015 | Ikuta | B25D 17/043 173/117 |
| 2016/0020443 | A1 * | 1/2016 | White | B25F 5/00 318/245 |
| 2016/0067856 | A1 * | 3/2016 | Bito | B25D 17/24 173/128 |
| 2017/0057064 | A1 * | 3/2017 | Ishikawa | B25B 23/1475 |
| 2017/0101747 | A1 | 4/2017 | Borgers et al. | |
| 2017/0193761 | A1 | 7/2017 | Suzuki | |
| 2017/0312902 | A1 | 11/2017 | Noguchi et al. | |
| 2018/0099393 | A1 | 4/2018 | Iida et al. | |
| 2018/0193995 | A1 * | 7/2018 | Runau | B25F 5/02 |
| 2018/0345469 | A1 | 12/2018 | Tanabe et al. | |
| 2018/0352671 | A1 | 12/2018 | Takasaki | |
| 2019/0006980 | A1 * | 1/2019 | Sheeks | H01M 10/4207 |
| 2019/0195019 | A1 | 6/2019 | Wang | |
| 2019/0381646 | A1 * | 12/2019 | Yoshikane | B25F 5/02 |
| 2020/0032461 | A1 | 1/2020 | Widlroither | |
| 2020/0130161 | A1 * | 4/2020 | Zawisza | B25D 11/005 |
| 2020/0306946 | A1 | 10/2020 | Takeuchi | |
| 2020/0391369 | A1 | 12/2020 | Furusawa et al. | |
| 2021/0162526 | A1 | 6/2021 | Aoki | |
| 2021/0230810 | A1 * | 7/2021 | Widlroither | E01B 27/20 |
| 2021/0268636 | A1 * | 9/2021 | Braun | B25F 5/006 |
| 2021/0339372 | A1 | 11/2021 | Geiger et al. | |
| 2022/0026050 | A1 * | 1/2022 | Harvey | F21V 23/0414 |
| 2022/0247280 | A1 | 8/2022 | Purohit et al. | |
| 2022/0271624 | A1 | 8/2022 | Wang et al. | |
| 2022/0295657 | A1 | 9/2022 | Zapata et al. | |
| 2023/0026934 | A1 * | 1/2023 | Yoshikane | B25D 17/24 |
| 2023/0027574 | A1 | 1/2023 | Yoshikane et al. | |
| 2023/0063991 | A1 | 3/2023 | Bader et al. | |
| 2023/0241752 | A1 | 8/2023 | Maegawa et al. | |
| 2024/0109171 | A1 | 4/2024 | Ringler et al. | |
| 2024/0116160 | A1 | 4/2024 | Ringler et al. | |
| 2024/0316743 | A1 | 9/2024 | Ringler et al. | |

FOREIGN PATENT DOCUMENTS

| | | | | |
|---|---|---|---|---|
| CN | 206640466 | U | 11/2017 | |
| CN | 110625574 | A | 12/2019 | |
| DE | 202012012149 | U1 | 2/2013 | |
| DE | 102018210189 | A1 | 12/2019 | |
| EP | 1980371 | A1 * | 10/2008 | B25D 11/125 |
| EP | 3 184 259 | A1 | 6/2017 | |
| JP | 2008073836 | A * | 4/2008 | B25D 11/062 |
| JP | 2015-066628 | A | 4/2015 | |
| JP | 2015066629 | A * | 4/2015 | B25D 17/043 |
| JP | 2015-100898 | A | 6/2015 | |
| JP | 2016-087703 | A | 5/2016 | |
| JP | 2016-165783 | A | 9/2016 | |
| JP | 2016-165784 | A | 9/2016 | |
| JP | 2017-056537 | A | 3/2017 | |
| JP | 2017-113863 | A | 6/2017 | |
| JP | 2018-062053 | A | 4/2018 | |
| JP | 2018-094634 | A | 6/2018 | |

(56) References Cited

FOREIGN PATENT DOCUMENTS

| | | | |
|---|---|---|---|
| JP | 2020-157423 | A | 10/2020 |
| JP | 2020-199608 | A | 12/2020 |
| JP | 2022-017127 | A | 1/2022 |
| WO | 2013139425 | A1 | 9/2013 |
| WO | 2020/031888 | A1 | 2/2020 |

OTHER PUBLICATIONS

Jul. 18, 2024 Office Action issued in U.S. Appl. No. 17/841,944.
U.S. Appl. No. 18/152,883, filed Jan. 11, 2023 in the name of Masahiro Maegawa et al.
Nov. 12, 2024 Office Action issued in U.S. Appl. No. 18/152,883.
Nov. 19, 2024 Office Action issued in Japanese Patent Application No. 2021-121981.
Dec. 10, 2024 Office Action issued in Japanese Patent Application No. 2021-121982.
Nov. 19, 2024 Office Action issued in Japanese Patent Application No. 2021-121976.
Jan. 7, 2025 Office Action issued in Japanese Patent Application No. JP 2021-121979.
Apr. 23, 2025 Office Action issued in U.S. Appl. No. 17/841,944.
Feb. 4, 2025 Office Action issued in Japanese Patent Application No. 2021-121976.
Sep. 10, 2025 Office Action issued in U.S. Appl. No. 17/841,944.
Sep. 30, 2025 Office Action issued in Japanese Patent Application No. 2022-014746.
Jun. 24, 2025 Office Action issued in Japanese Patent Application No. 2022-014746.
Jun. 24, 2025 Office Action issued in Japanese Patent Application No. 2022-014748.
May 28, 2025 Office Action issued in U.S. Appl. No. 18/152,883.
Jan. 15, 2026 Office Action issued in U.S. Appl. No. 17/841,944.
May 20, 2026 Office Action issued in Chinese Patent Application No. 202210864350.7.
May 12, 2026 Office Action issued in Chinese Patent Application No. 202210864361.5.
Jun. 16, 2026 Notice of Allowance issued in U.S. Appl. No. 17/841,944.

* cited by examiner

STRIKING TOOL

TECHNICAL FIELD

This disclosure is related to a striking tool such like a so-called large hammer in which usual operation is defined as a striking operation to the downward in a state that the striking tool is downwardly dropped by the own weight of the striking tool.

BACKGROUND OF THE INVENTION

An example of the striking tool is disclosed in Japanese laid-open patent application 2016-165783A (Patent reference 1).

According to this patent reference 1, a technique regarding an optimization of disposing a battery for a cordless large hammer.

In this respect, with respect to the large hammer, it is highly required to rationalize the disposition of the component parts and the operability because the large hammer is having (1) large weight, (2) large size and (3) large amount of output force.

Especially, as one aspect the of technical development strongly targeting on the recent ESG (or SDGs) concept, it is desired to focus on decreasing the environmental load, increasing the energy efficiency and ergonomically designing the products.

According to the cordless type large hammer, the battery for operating the hammer teds to have more energy capacity and large size. Further, recent development trend is focusing on an equipment of a plurality of batteries. Having regard to these circumstances, not only the optimization of merely the disposition of the battery but also the structural rationalization of the entire tool design is necessarily required.

PRIOR ART REFERENCE

Patent Reference

[Patent reference 1]
JP 2016-165783 A

SUMMARY OF THE DISCLOSURE

Problem to be Solved by the Disclosure

The object of the disclosure is to provide a structuring technique which contributes to the rationalization of dispositioning parts and operability with respect to a striking tool such like a so-called large hammer in which usual operation is defined as a striking operation to the downward in a state that the striking tool is downwardly dropped by the own weight of the striking tool.

Embodiment to Achieve the Above Explained Object

One aspect of the disclosure (aspect 1) to solve the above explained problem relates to a striking tool comprising:

an elongated main housing having a tool holder at the front end of the main housing and a pair of handles, wherein, when a first direction is defined by a longitudinal direction of the main housing and a second direction is defined by a direction crossing the first direction, the handle extends in the second direction, wherein usual operation of the striking tool is defined as a striking operation to the downward by an end tool detachably attached to the tool holder, in a state that the user of the striking tool holds the handle and the striking tool is downwardly dropped by the own weight of the striking tool.

The representative striking tool further comprises;

a drive mechanism which drives the end tool in the first direction and a motor having a motor output shaft to drive the drive mechanism, wherein the motor output shaft extends in a third direction which is defined by a thickness direction to cross both with the first direction and the second direction and, a battery mounting portion is disposed at the side region of the main housing in the second direction, wherein a battery to supply electricity to the motor is mounted to the battery mounting portion.

Typically, the representative striking tool is applicable to a striking tool, wherein usual operation of the striking tool is defined as a striking operation to the downward in a state that the striking tool is downwardly dropped by the own weight of the striking tool. Namely, the representative striking tool is suitable for a large sized hammer.

Especially in the large hammer, the battery tends to have more energy capacity and large size in order for a large amount of output requirement. Therefore, both the optimization of the disposition of the battery and the structural rationalization of the entire tool design is important.

For this reason, according to the representative striking tool, the motor output shaft extends in a third direction which is defined by a thickness direction to cross both with the first direction and the second direction.

By such construction, the output shaft which tends to be the largest size component element of the motor can be allocated to extend in the third direction as the thickness direction of the striking tool. And as a compensation of such allocation, the space along the second direction as the width direction of the striking tool can be largely secured as an expanded space.

As a result, the battery mounting portion is disposed at the side region of the main housing in the second direction, even when the battery becomes relatively large, such battery can be easily mounted by utilizing the largely secured expanded space.

Further, by largely securing the space along the second direction as the width direction of the striking tool, the battery which has relatively heavy weight can be disposed closely to the central axis of the main housing. Therefore, the striking tool can be prevented from becoming large in the width direction and the entire weight balance can be improved as well as decreasing the moment of couple.

According to the invention, with respect to a striking tool in which usual operation is defined as a striking operation to the downward in a state that the striking tool is downwardly dropped by the own weight of the striking tool, a structuring technique which contributes to the rationalization of dispositioning parts and operability is provided.

EMBODIMENT TO EXPLOIT THE INVENTION

Figure 1:
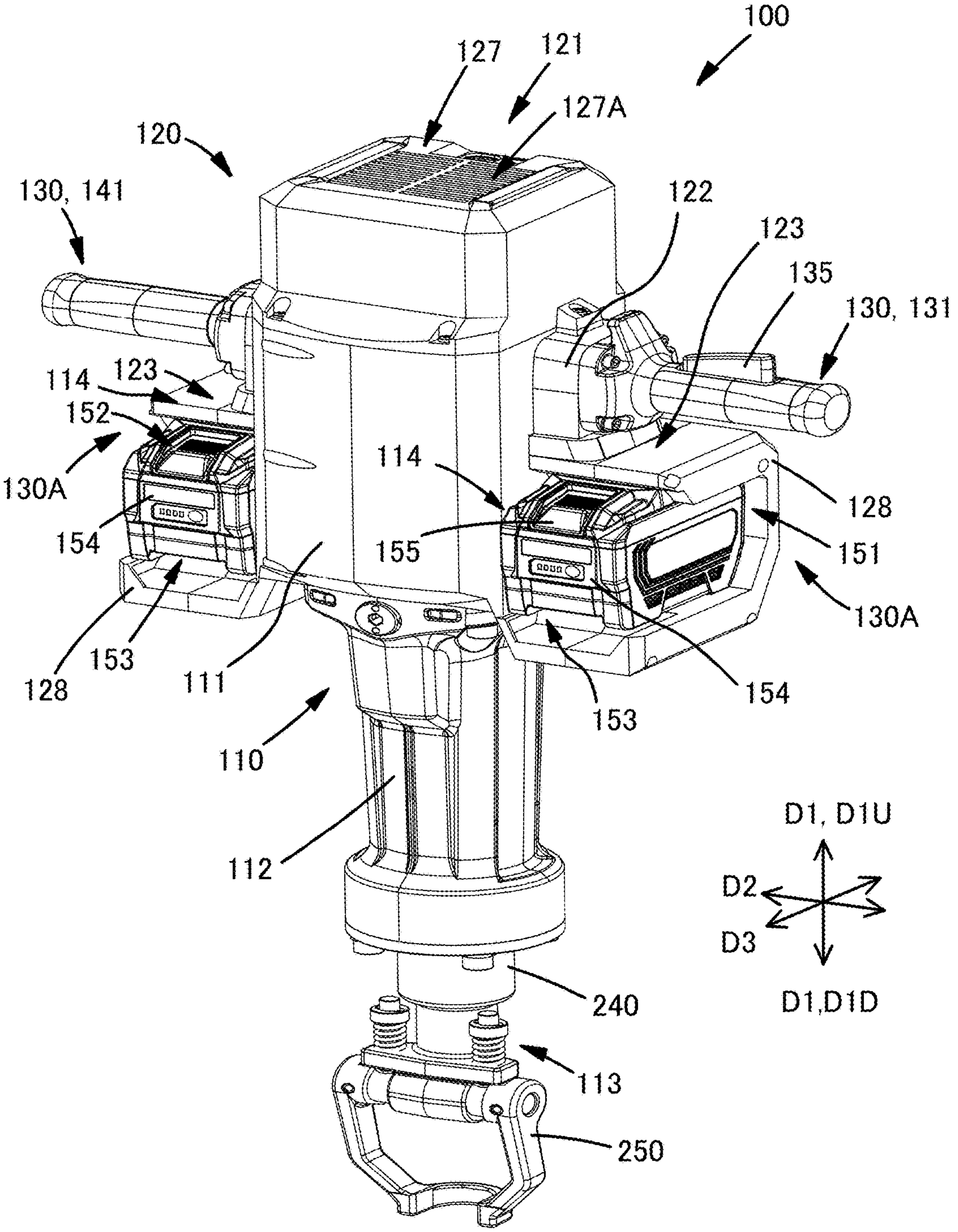
FIG. 1 shows a front side (user's side) perspective view showing the entire structure of the striking tool according to the representative embodiment.

As to the structure explained above, following exemplary aspects can be appropriately adopted. Further, combination of plurality of exemplary aspects can also be adopted.

(Aspect 2)

A pair of the battery mounting portions may preferably be provided and each of the battery mounting portions is disposed at the respective side of the main housing in the second direction in pair.

By this construction, batteries can be disposed in pair and then, maintaining the weight balance of the entire striking tool, power supply can be increased.

Note that "in pair" defines that the battery mounting portions as both sides form a pair. However, in respect of the high power and high energy capacity, additional battery mounting portion(s) can be disposed.

Especially in terms of largely securing space along the second direction which defines the width direction of the striking tool, both side faces of the main housing in the second direction can be utilized and the disposition of the component element can much more be rationalized.

(Aspect 3)

The outer shape of the battery may preferably be disposed at an inside of a virtual line which connects a free end region of the handle and the front-end region of the main housing in a state that the battery is mounted to the battery mounting portion. The "virtual line" in this aspect may be defined by a linear virtual line connecting the free end region of the handle and the front-end region of the main housing at the shortest distance.

By this construction, the battery mounted to the battery mounting portion is prevented from unnecessarily outwardly projecting and from hindering the operability. Further, the battery can be prevented from being damaged when the striking tool falls down.

(Aspect 4)

The handle may preferably comprise a grip portion which linearly extends for user's gripping.

By this construction, gripping structure can be secured for gripping by both hands to improve the operability.

(Aspect 5)

In a case that the direction from the handle to the tool holder is defined as lower side and the direction from the tool holder to the handle is defined as upper side with respect to the first direction, the battery mounting portion may preferably be disposed at the region right below the handle at the lower side in the first direction.

By this construction, the weight balance of the striking tool can be improved. Further, when changing the battery by gripping the handle, further improvement of the operability can be secured.

(Aspect 6)

The battery mounting portion may preferably be provided such that the battery is slidably mountable to cross the first direction.

By this construction, the battery sliding mounting direction can be intersect with the first direction in which vibration during the striking operation often takes place. As a result, unintentional dropping off of the battery by the vibration can effectively be prevented.

(Aspect 7)

The drive mechanism may preferably comprise a motion converting mechanism which converts a rotational movement of the output shaft to a linear movement in the first direction, wherein the battery mounting portion may be disposed to overlap with the motion converting mechanism in the first direction.

By this construction, the motion converting mechanism and the battery as component elements with relatively heavy weight can be concentratedly disposed so as to improve the weight balance of the entire striking tool.

(Aspect 8)

The motion converting mechanism may preferably be disposed in the main housing at a side away from the user of the striking tool in the third direction.

By this construction, the motion converting mechanism as component element with relatively heavy weight can be optimized so as to improve the weight balance of the entire striking tool.

(Aspect 9)

The main housing may preferably comprise a battery protector to protect the outer shape of the battery which is mounted to the battery mounting portion. The battery protector may typically be formed by a cover at least partly covering the outer shape of the battery or by a housing box to at least partly house the outer shape of the battery.

By this construction, the battery or the battery mounting portion can be securely protected from the outer force.

(Aspect 10)

The pair of handles may preferably be formed in a ring shape as viewed in the first direction.

By this construction, the gipping capability by the user can be improved.

Note that "ring shape" may preferably be provided by loop shape, rectangular loop shape and so on. Further, the handle as itself can define the ring shape or a combination of the main housing and the handle can define the ring shape.

To form the pair of handles in ring shape may contribute to increase the freedom of selection as to which part of the handle the user will grip. As a result, operability based on an ergonomic design is further improved.

(Aspect 11)

The battery mounting portion may preferably be disposed within the ring portion of the handle. Namely, the pair of handles may also be a guard portion for the battery mounted in the battery mounting portion from the external force.

By this construction, both the gripping capability by the user and the protection capability of the battery from the external force can rationally be improved at the same time.

Note that "within the ring portion of the handle" may preferably embrace both the aspect that the battery mounting portion is entirely disposed within the ring portion and the aspect that at least a part of the battery mounting portion is disposed within the ring portion.

The striking tool as explained above may preferably further comprise:

a first housing and a second housing respectively defining component elements of the main housing, and an elastic member disposed between the first housing and the second housing, wherein the drive mechanism and the motor are disposed at the first housing, the pair of handles are disposed at the second housing, the second housing is, together with the pair of handles, relatively movable to the first housing by means of the elastic member, wherein slide guide members to guide the relative movement between the first housing and the second housing are respectively disposed at a plurality of points in the first direction.

Due to the slide guide by using the plurality of slide guide members in the first direction, any force in the direction other than the first direction can be prevented from being exerted with respect to the relative movement between the first housing and the second housing. As a result, stable and smooth relative movement can be secured.

A striking tool 100 as a representative embodiment of the invention is now explained in reference to FIG. 1 to FIG. 20.

Figure 2:
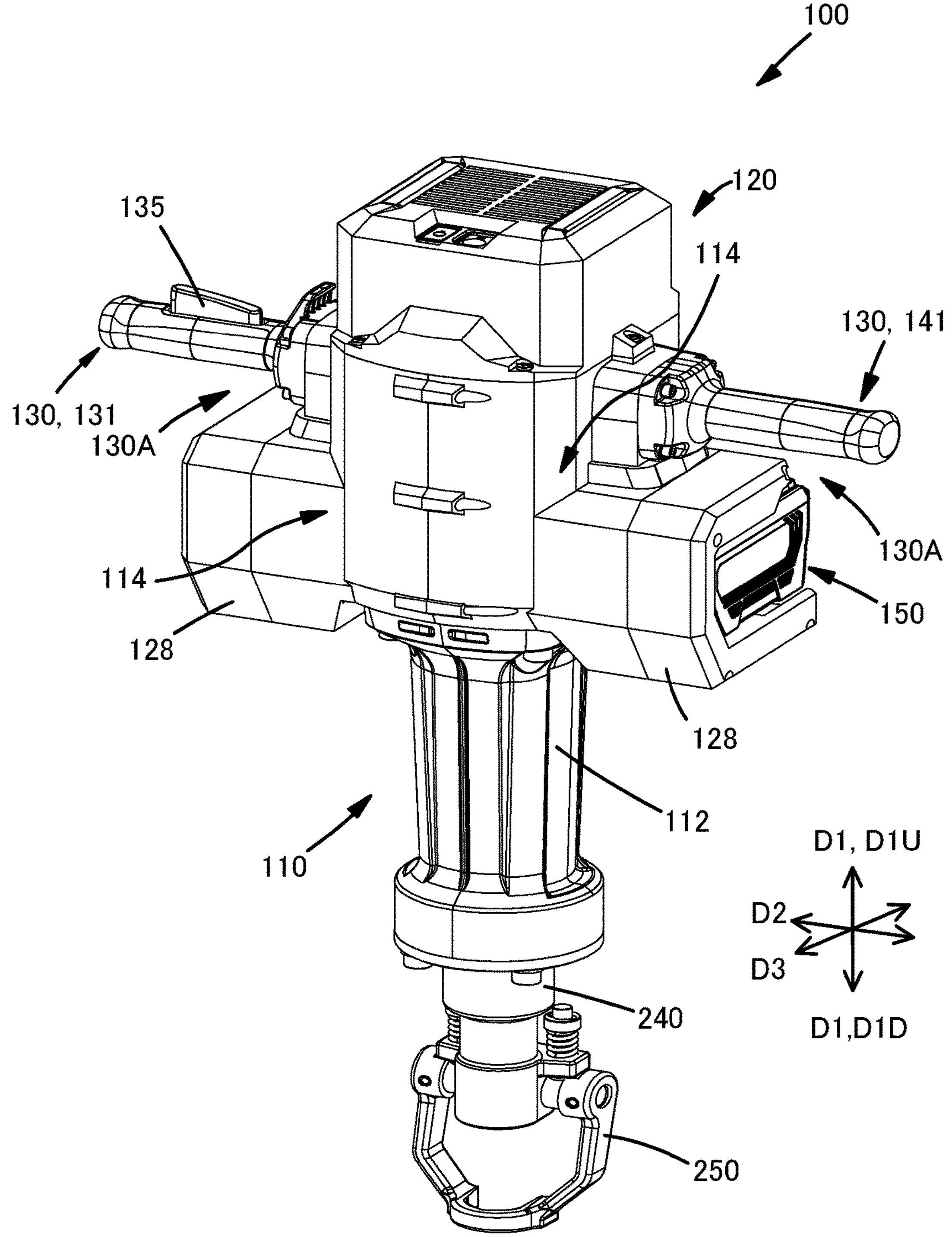
FIG. 2 shows a back side perspective view showing the entire structure of the striking tool according to the representative embodiment.
Figure 3:
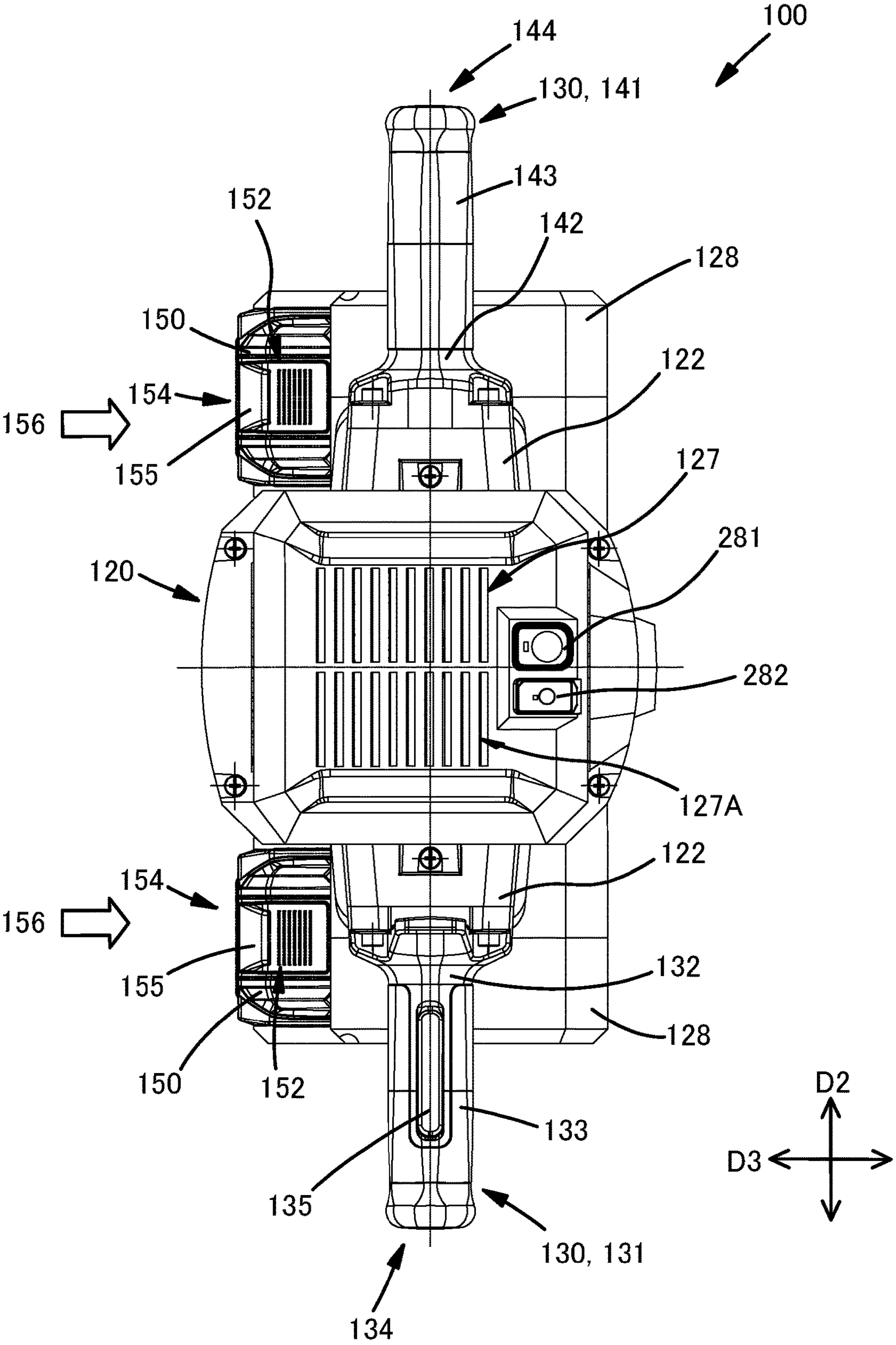
FIG. 3 shows a plane view of the striking tool according to the representative embodiment.

FIG. 1, FIG. 2 and FIG. 3 respectively show the entire structure of the striking tool 100 as a front side perspective view, as a rear side perspective view and as a plane view.

Figure 4:
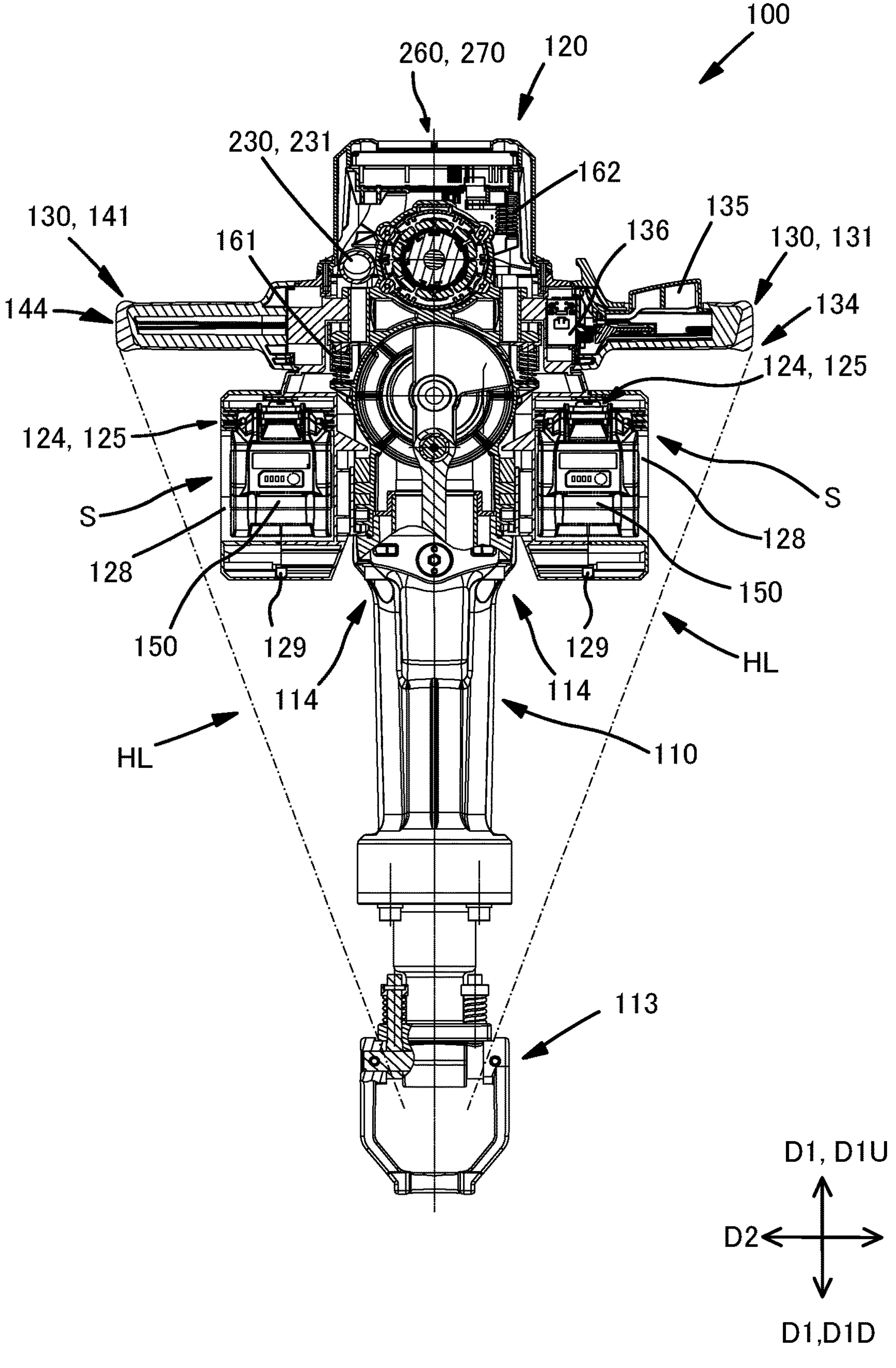
FIG. 4 shows a front sectional view of the striking tool according to the representative embodiment.
Figure 5:
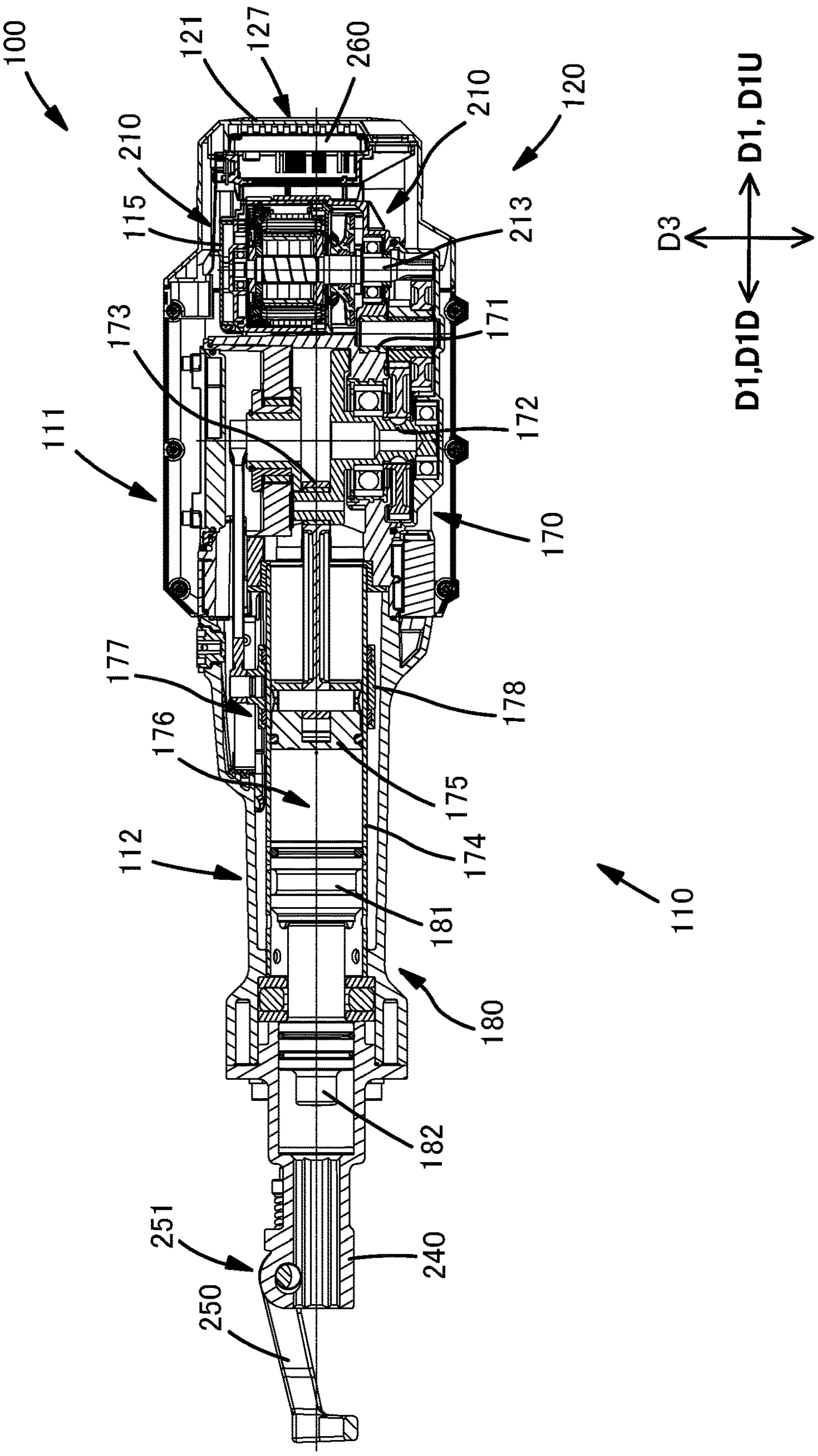
FIG. 5 shows a sectional side face view (right side face) of the striking tool according to the representative embodiment.
Figure 6:
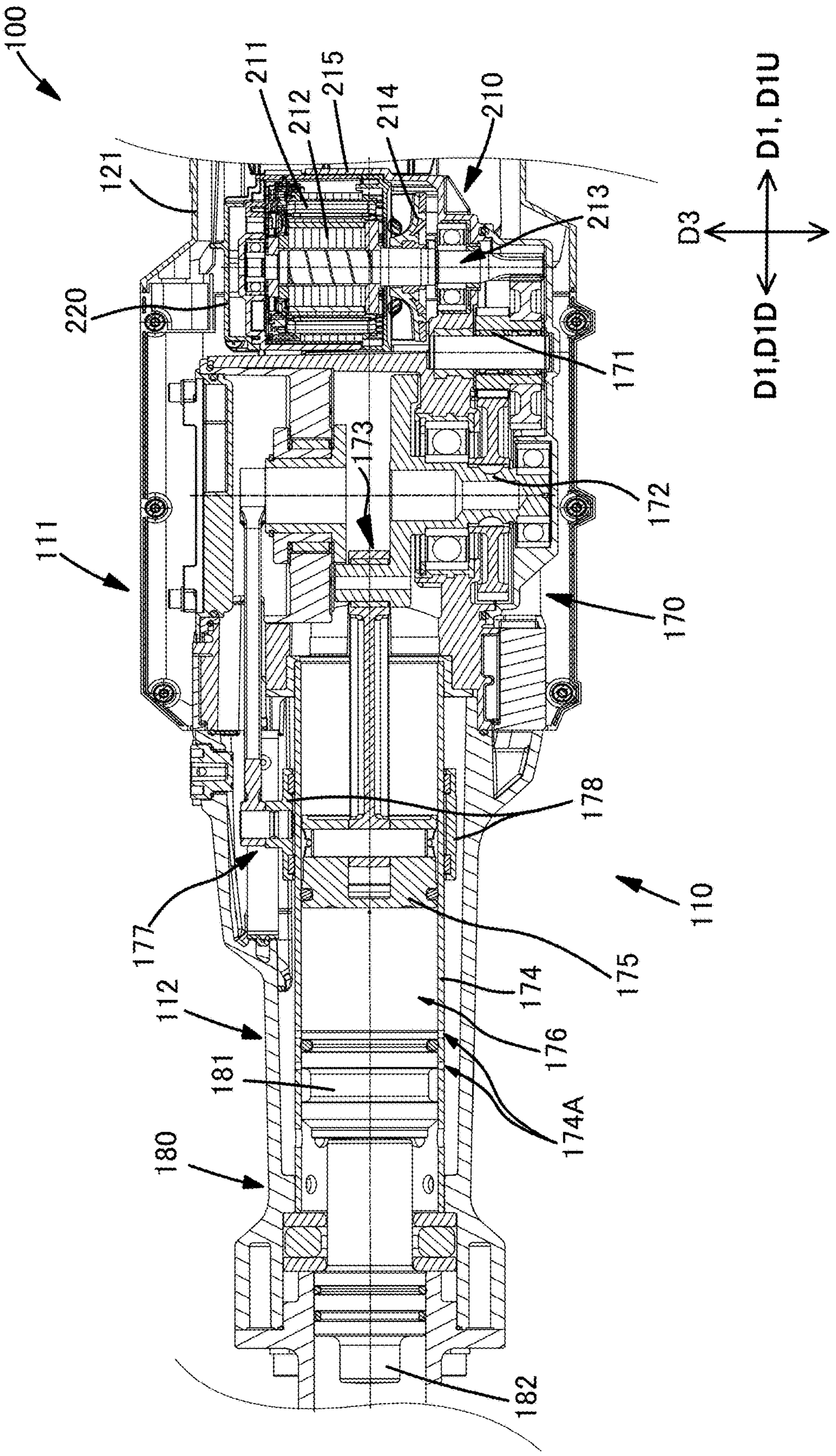
FIG. 6 shows an enlarged sectional side face view (right side face) of the striking tool according to the representative embodiment.
Figure 7:
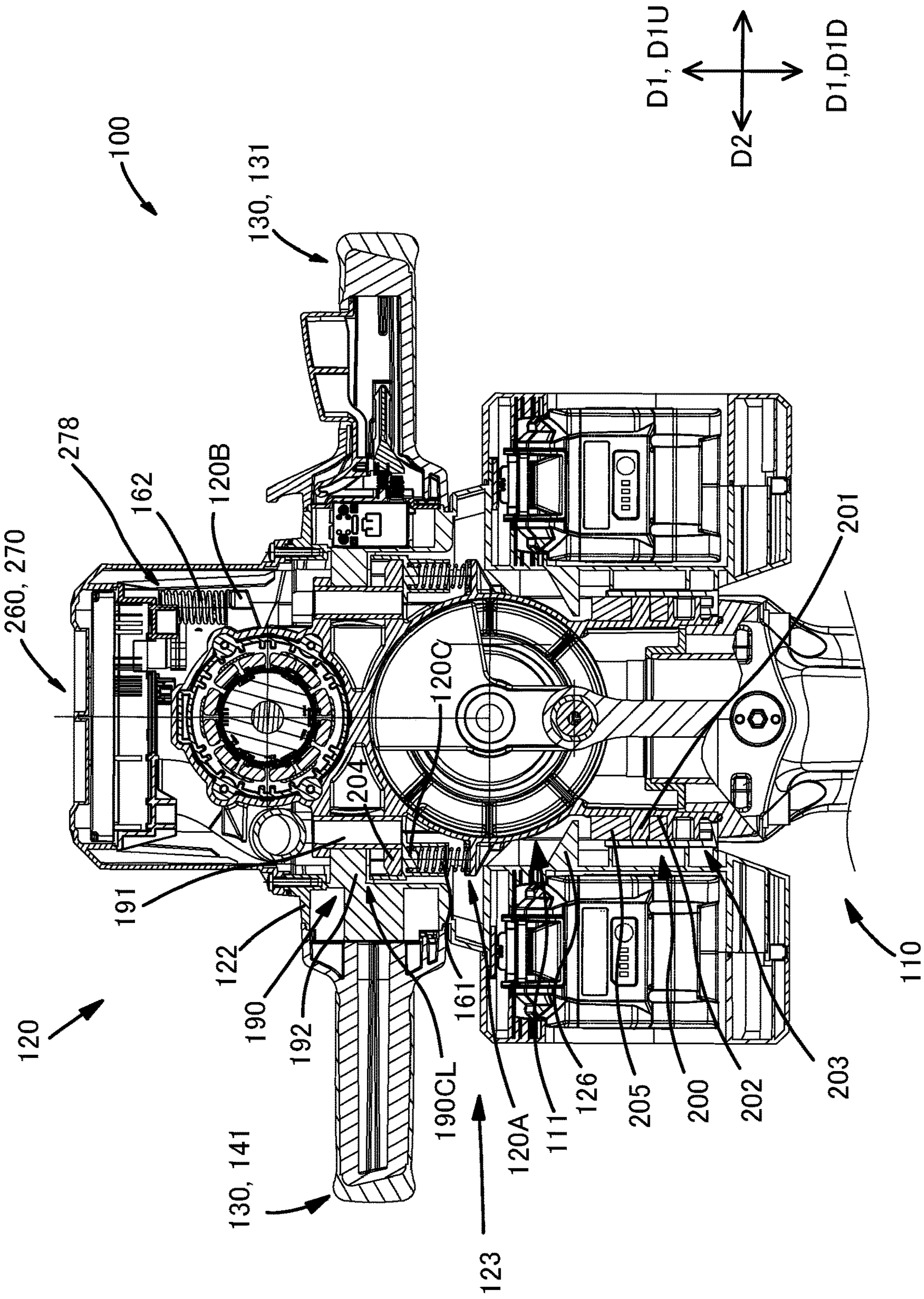
FIG. 7 shows an enlarged front sectional view showing the upper structure of the striking tool according to the representative embodiment.

Further, in FIG. 4 and FIG. 5, a front side cross sectional view and the side face cross sectional view, respectively. Further, a partly enlarged cross sectional view of the side face of the striking tool 100 is shown in FIG. 6 and a front side enlarged cross sectional view of the striking tool 100 is shown in FIG. 7.

According to the representative embodiment, for the sake of convenience for the technical explanation, the longitudinal direction of the striking tool 100 is defined as a first direction D1. The longitudinal direction is also referred to as an elongated direction (upper and lower direction on the paper in FIG. 1).

Further, the width direction to cross the longitudinal direction is defined as a second direction D2. The width direction is also referred to as a right and left direction (right and left direction on the paper in FIG. 1).

Further, the thickness direction of the striking tool 100 to perpendicularly cross the first direction D1 and the second direction D2 is defined as a third direction D3.

Further, with respect to the first direction D1, the direction to head to the downward of the paper face of FIG. 1 is defined as D1D, while the direction to head to the upward as D1U.

(Entire Structure of the Striking Tool 100)

As shown in FIG. 1 to FIG. 6, the striking tool 100 substantially comprises at its outer look, a first housing 110 and a second housing 120.

The second housing 120 is connected to an upper side of the first housing 110, such that the second housing 120 is relatively movable to the first housing 110.

(Structure of the First Housing 110)

The first housing 110 is formed in an elongated shape and includes an upper side drive mechanism housing part 111, a lower side drive mechanism housing part 112 and a front end region 113.

Further, at the second direction side of the upper side drive mechanism housing part 111 and the lower side drive mechanism housing part 112, a side region 114 is provided.

The upper side drive mechanism housing part 111, the lower side drive mechanism housing part 112 and the front end region 113 are respectively disposed (located, positioned or arranged) in a connected manner in this order in the first direction D1.

The upper side drive mechanism housing part 111 mainly houses a motor 210 and a motion converting mechanism 170. The lower side drive mechanism housing part 112 mainly houses a striking mechanism 180. The motion converting mechanism 170 and the striking mechanism 180 is a structural example of "drive mechanism".

Detailed construction of the motor 210, the motion converting mechanism 170 and the striking mechanism 180 is explained later.

The front region 113 is provided with a tool holder 240 and a retainer 250.

The tool holder 240 is a tool mounting part for serving the striking operation. The retainer functions as a retaining part for the end tool mounted to the tool holder 240.

Note that the indication of the end tool in the drawings is abbreviated for the sake of convenience.

(Structure of the Second Housing 120)

The second housing 120 is provided at an upper side of the first housing 110 in a connected manner in the first direction D1. The second housing 120 comprises a head case 121, a handle mounting portion 122 and a battery mounting portion 123.

The head case 121 forms the outer shape of the second housing 120. The head case 121 mainly houses a controller 260 and a controller case 270 (also see FIG. 10 and FIG. 11).

Further, a cooling air intake part 127 is provided at the top face portion of the head case 121 in the first direction upper side D1U.

The handle mounting portion 122 is provided in pair in the second direction D2. The handle mounting portion 122 is integrally connected to the head case 121. As is explained later, a handle 130 is attached to the handle mounting portion 122.

The battery mounting portion 123 is provide in pair in the second direction D2. The battery mounting portion 123 is integrally connected to the handle mounting portion 122 at the first direction lower side D1D. As is explained later, a battery 150 is attached to the battery mounting portion 123.

The battery mounting portion 123 is provided at the side region 114 of the first housing 110 and at the region right below the handle 130A (handle below region 130A) of the handle mounting portion 122 in the first direction D1.

Further, the battery mounting portion 123 comprises a slide guide 124 for mounting the battery 150 and an electricity supply terminal 125 (see FIG. 4).

Each of the battery mounting portion 123 is provided with a battery protector 128 to protect the outer body of the battery 150 in a state that the battery 150 is attached to the battery mounting portion 123.

The battery mounting portion 123 includes the head case 121, the handle mounting portion 122 and the battery protector 128 in an integral and connecting manner to define the second housing 120. The battery mounting portion 123 is entirely able to relatively move to the first housing 110. Note that the detail of the relative movement of the second housing 120 to the first housing 110 is explained later.

(Structure of the Handle 130)

The handle 130 comprises a first handle member 131 and a second handle member 141 in pair. The first handle member 131 and the second handle member 141 respectively project in the second direction D2 from the first housing 110.

Typically, the first handle member 131 is served for the grip by user's right hand, while the second handle member 141 is served for the grip by user's left hand.

As is shown in FIG. 3 in detail, the first handle member 131 comprises a first handle base portion 132, a first handle grip portion 133 and a free end region 134. A trigger 135 is provided at the first handle grip portion 133.

The trigger 135 is always biased to the off-position and is able to move to an on-position opposing to the biasing force to the off-position by a manual pushing operation holding the first handle member 131. In FIG. 1 to FIG. 4, the trigger in a state at the off-position (initial state) is indicated.

The trigger 135 moves back to the initial state by the biasing force to the off-position when the pushing operation by the user is released. As shown in FIG. 4, the trigger 135 is connected to an electric switch 136 disposed in the handle mounting portion 122. By the trigger 135 moving to the on-position, the electric switch 136 is placed at an on state and an on-signal is sent to the controller 260 as is explained later.

The second handle member 141 comprises a second handle base portion 142, a second handle grip portion 143 and a free end region 144.

(Structure of the Battery 150)

As shown in FIG. 1 to FIG. 3, the battery 150 is substantially formed in a rectangular cubic shape to comprise a battery front face portion 151, a battery upper face portion 152, a battery bottom face portion 153 and a battery rear face portion 154. The battery 150 is provided with a package body as a battery assembly with a plurality of battery units.

Further, a lock release portion (unlock portion) 155 is provided at the battery upper face portion 152 in a vicinity of the battery rear face portion 154. The lock release portion 155 is manually operated when the battery is detached from the second housing 120.

As shown in FIG. 3, the battery 150 is attached to the battery mounting portion 123 of the second housing 120 by sliding the battery 150 in the battery mounting direction 156. As a result, the battery 150 is engaged with the slide guide 124 of the battery mounting portion 123 and electrically connected to the electricity supply terminal 125 such that the battery 150 is in a state to be able to supply electricity to the striking tool 100.

The battery mounting direction 156 is defined by a direction to perpendicularly cross both the first direction D1 and the second direction D2 and to extend in line with the third direction D3.

On the other hand, the battery 150 is detached from the second housing 120 by manually operating the lock release portion 155 to slide the battery 150 in the direction opposite to the battery mounting direction 156. In other words, the battery mounting direction 156 and the battery detaching direction (the direction opposite to the battery mounting direction 156) are respectively crossing (perpendicular) to the first direction D1 and the second direction D2.

The battery protector 128 as explained above protects the battery 150 from outer force by covering the battery front face portion 151, the battery upper face portion 152 and the battery bottom face portion 153 (as well as a part of the battery side face portions) in a state that the battery 150 is attached to the battery mounting portion 123.

In other words, the battery protector 128 is structured as a covering member to entirely or partly cover the battery front face portion 151, the battery upper face portion 152 and the battery bottom face portion 153.

Further, as shown in FIG. 4, a LED light 129 is disposed at a lower face of the battery protector 128 (first direction lower side D1D) in order for lighting the front-end region 113 and the tip end of the end tool. The LED light is one of the functional members to assist the striking operation.

According to the representative embodiment, as shown in FIG. 4, the battery 150 attached to the battery mounting portion 123 is provided such that the battery 150 is disposed together with the battery protector 128 at an inside of the virtual line HL which connects the respective free end regions 134, 144 of the first handle portion 131 and the second handle portion 141 with the front end region 113 of the first housing 110 (namely at the side closer to the striking tool 100 than the virtual line HL).

By this construction, the battery 150 attached to the battery mounting portion 123 and the battery protector 128 are prevented from being an obstacle to the striking operation. Moreover, if the striking tool 100 inadvertently falls down, because the battery 150 (and the battery protector 128) is disposed at the inside of the virtual line HL which is to be the grounding line, impact at the time of such falling down can be alleviated and thus, protectability against the outer force can be enhanced.

(Structure of the Motor 210)

As shown in FIG. 5 and FIG. 6, the motor 210 is mainly provided with a stator 210, a rotor 212, an output shaft 213 integrally connected to the rotor 212 and a cooling fan 214 integrally connected to the output shaft 213. As the cooling fan 214, a centrifugal typed fan is adopted to the representative embodiment.

Each component element of the motor 210 is housed within the motor housing 215 and is disposed in the first housing 110.

The output shaft 213 is rotatably connected with a first intermediate shaft 171 of the motion converting mechanism 170 with a predetermined reduction ratio at an opposing side to the user of the striking tool 100 in the third direction D3. The rotating output of the motor 210 is transmitted to the motion converting mechanism 170 from the output shaft 213 via the first intermediate shaft 171.

According to the representative embodiment, a blushless motor is adopted for the motor 210 because the blushless motor has relatively a compact size but can generate relatively large output. Due to the fact that the structure of the brushless motor as itself pertains to a known art, the detailed explanation of it is abbreviated.

The output shaft 213 is provided to cross with the first direction D1 and the second direction D2. On the other hand, the output shaft 213 extends along the third direction D3. In other words, the output shaft 213 which tends to be the largest sized component element of the motor 210 is disposed to extend in line with the third direction D3. As the third direction D3 defines the thickness direction of the striking tool 100, the largest sized component element of the motor 210 is allocated to the third direction D3 and therefore, instead of that, the space along the second direction D2 which defines the width direction of the striking tool 100 can be utilized for disposing of other functional element(s).

Specifically, as especially shown in FIG. 1 and FIG. 4, spaces of the side region 114 of the first housing 110 in the second direction D2 can be largely secured. According to the representative embodiment, by utilizing the expanded space S secured at the side region 114, the battery mounting portion 123, as a part of the second housing 120, is disposed. As a result, when the battery 150 is attached to the battery mounting portion 123, or when the battery protector 128 is disposed, the operation is not hindered by means of such optimization of the space efficiency.

(Structure of the Motion Converting Mechanism 170)

As shown in FIG. 5 and FIG. 6, the motion converting mechanism 170 is mainly provided with a first intermediate shaft 171, a second intermediate shaft 172, a crank mechanism 173, a cylinder 174, a piston 175, an air chamber 176 and a vibration reducing mechanism 177.

The first intermediate shaft 171 is, as is explained above, rotatably connected with the output shaft 213 of the motor 210. Further, the first intermediate shaft 171 is rotatably connected with the second intermediate shaft 172 with a predetermined reduction ratio.

The second intermediate shaft 172 is integrally connected with the crank shaft 173 and with the vibration reducing mechanism 177 such that the second intermediate shaft 172 can drive the vibration reducing mechanism 177.

The crank mechanism 173 changes the rotating movement of the second intermediate shaft 172 around the third direction D3 to a linear movement in the first direction D1 and reciprocates the piston 175 linearly in the first direction D1. By the linear movement of the piston 175, a pressure fluctuation is generated within the air chamber 176 in the cylinder 174.

The vibration reducing mechanism 177 comprises a counter weight 178 which is linearly reciprocated in the first direction D1 along with the outer circumference of the cylinder 174. The counter weight 178 moves opposing to the striking movement of the striking mechanism 180 as is explained bellow and thus, alleviate the vibration exerted to the striking tool 100 during the striking operation.

(Structure of the Striking Mechanism 180)

As shown in FIG. 5 and FIG. 6, the striking mechanism 180 is mainly provided with a striker 181 and an impact bolt 182. As is explained above, when the pressure fluctuation is generated within the air chamber 176 in the cylinder 174, the striker 181 which is also disposed in the cylinder 174 opposing to the piston 175 across the air chamber 176 linearly moves in the first direction D1 to move the impact bolt 182 in the first direction D1.

As a result, the impact bolt 182 linearly moves the end tool (not shown in drawings for the sake of convenience) mounted in the tool holder 240 and the end tool performs the striking operation in the first direction D1.

Note that the end tool is retained in the first direction D1 by the retainer 250.

The retainer 250 is rotated around the rotating center 251 in FIG. 5 so as to be moved between a retaining position (corresponding to FIG. 5) and a release position.

(Structure of the First Slide Guide Member 190)

As explained above, the first housing 110 and the second housing 120 are respectively relatively movable to each other in the first direction D1.

Figure 8:
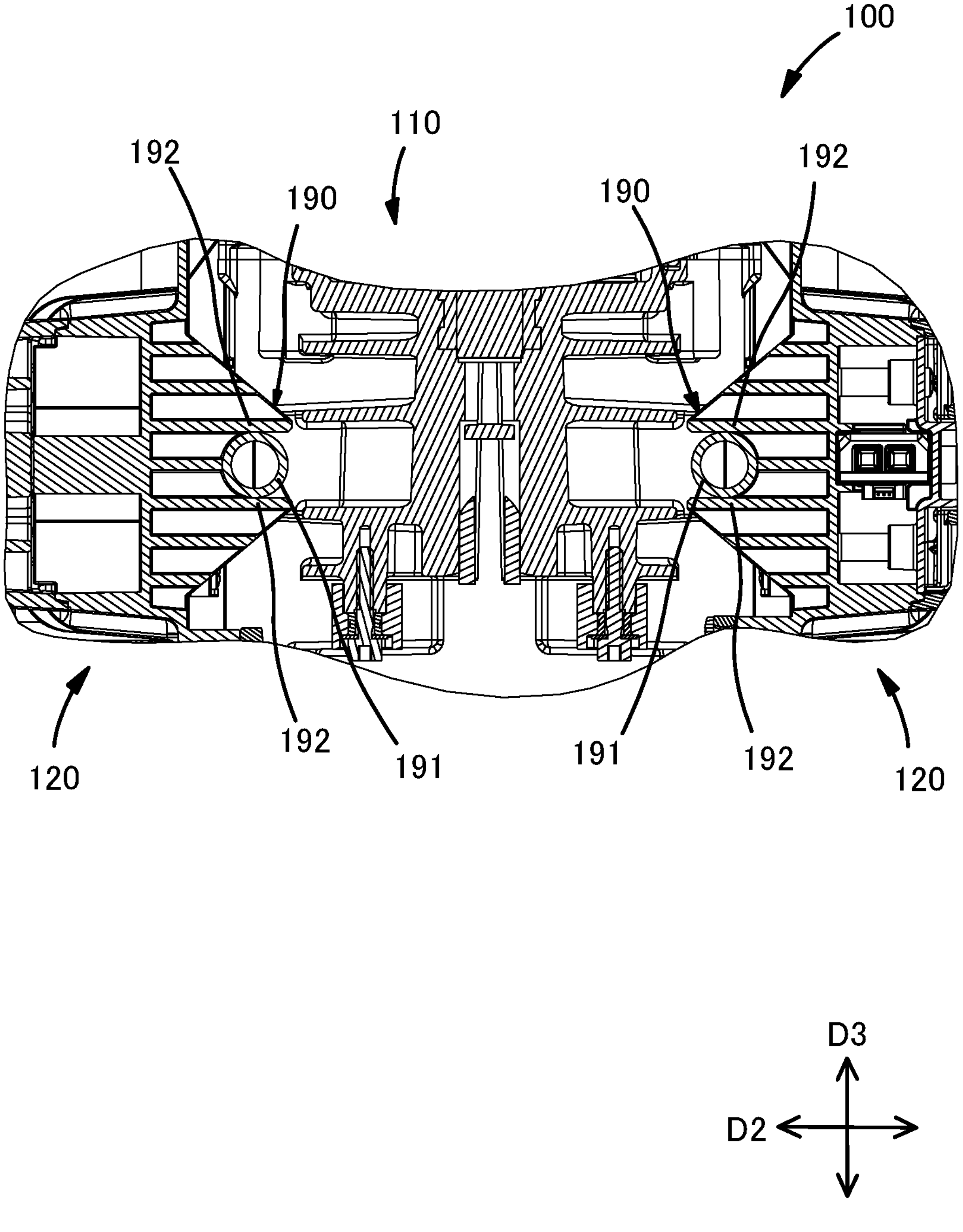
FIG. 8 shows a plane and partly sectional view showing the structure of a first slide guide member of the striking tool according to the representative embodiment.
Figure 9:
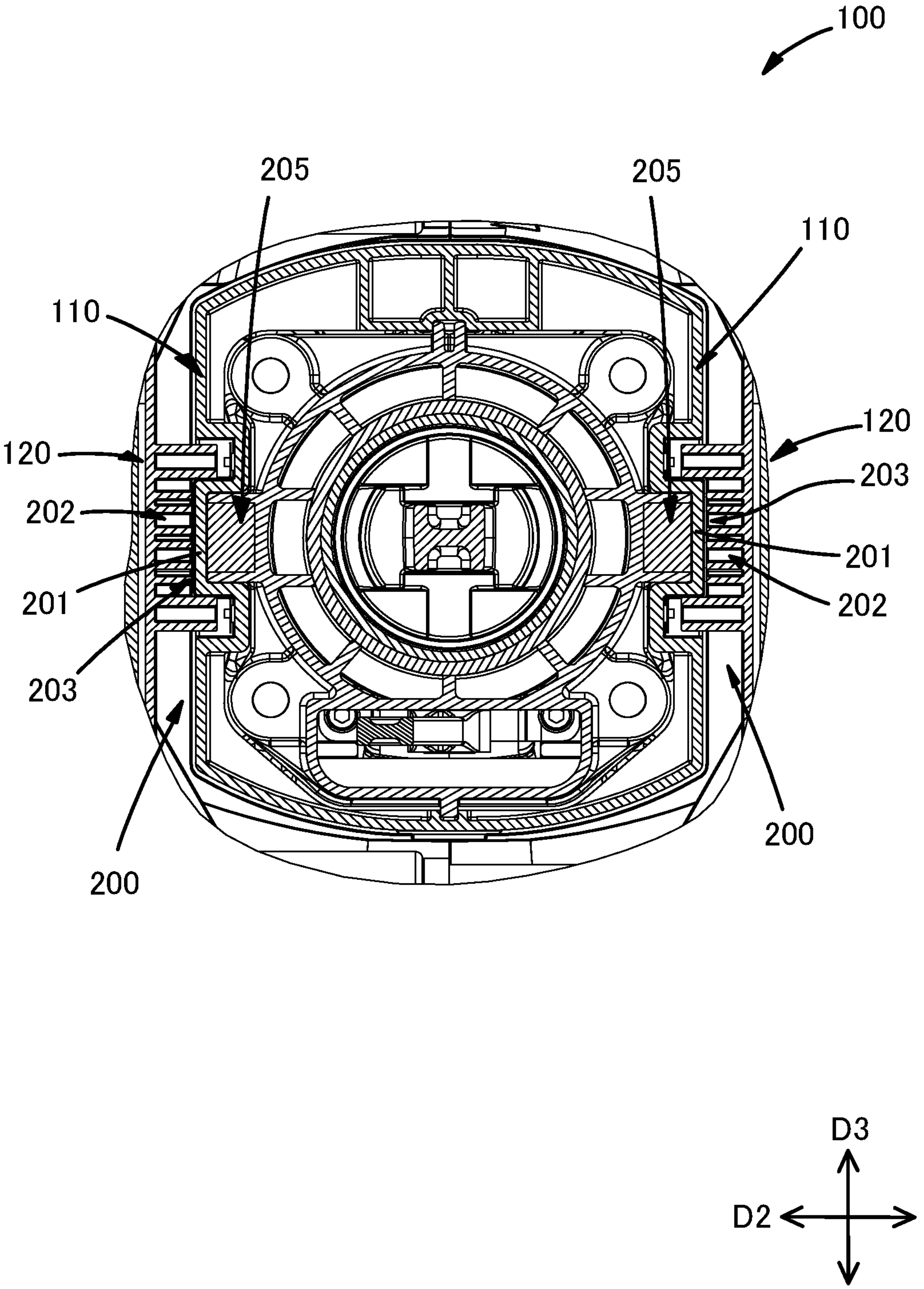
FIG. 9 shows a plane and partly sectional view showing the structure of a second slide guide member of the striking tool according to the representative embodiment.

And according to the representative embodiment, as shown from FIG. 7 to FIG. 9, a first slide guide member 190 and a second slide guide member 200 are respectively provided for smoothing such relative movement of the first housing 110 and the second housing 120.

The first slide guide member 190 is disposed at a close position to the handle 130 in the first direction D1 (substantially at the same height with the handle 130). The first slide guide member 190 comprises a pipe shaped member 191 as a component element of the first housing 110 side, a bifurcated member 192 as a component element of the second housing 120 side. The bifurcated member 192 is a member having a pair part literally bifurcately divided and is also called, for example, a forked member.

The pipe shaped member 191 is made of metal and the cross section of the pipe shaped member 191 has a circular shape. The longitudinal axis of the pipe shaped member 191 is fixedly disposed at the first housing 110 to extend in the first direction D1.

The bifurcated member 192 is made of resin and is fixed to the handle mounting portion 122 of the second housing 120 integrally with the handle 130. The bifurcated member 192 is play fitted with the pipe shaped member 191 (engaged with a play) such that the bifurcated portions are respectively along with the outer circumferential face of the pipe shaped member 191. Thus, the bifurcated member 192 is slidably and relatively movable to the pipe shaped member 191 in the first direction.

According to the representative embodiment, a plurality of the first slide guide members 190 are disposed around the first direction D1. Specifically, as shown in FIG. 8, two of first slide guide members 190 are opposingly disposed in pair.

(Structure of the Second Slide Guide Member 200)

The second slide guide member 200 is disposed at first direction lower side D1D lower than the first slide guide member 190. Specifically, the second slide guide member 200 is disposed in the vicinity of the battery 150 in the first direction D1 (substantially at the same height with the battery 150).

The second slide guide member 200 comprises a convex member 201, a concave member 202 and a slide guide 203.

The convex member 201 is made of resin and is fixedly provided at the side of the first housing 110. The convex member 201 projects outward in the second direction D2, as is shown in FIG. 9.

The concave member 202 is made of resin and is provided at the side of the second housing 120. The concave member 202 engages with the convex member 201 slidably in the first direction F1, as shown in FIG. 9.

The slide guide 203 is formed by bending a sheet metal. The slide guide 203 is fixedly welded to the first housing 110. The slide guide 203 is disposed between the convex member 201 and the concave member 202 to guide the relative slide movement of the convex member 201 and the concave member 202 as well as providing a reinforcement.

Further, according to the representative embodiment, a plurality of the second slide guide members 200 are disposed around the first direction D1 Specifically, as shown in FIG. 9, two of second slide guide members 200 are opposingly disposed in pair.

The second slide guide member 200 is provided with a cushioning member 205. The cushioning member 205 can contact with a cushioning member contact base 126 disposed at the second housing 120 side.

The cushioning member contact base 126 has a wedge-shaped cross section. The cushioning member contact base 126 is integrally formed with the battery mounting portion 123 of the second housing 120.

The cushioning member 205 is made of an elastic member such like a rubber, a urethane or a sponge. The cushioning member 205 is fixedly secured to the first housing 110. Specifically, the cushioning member 205 is disposed at the back side of the convex member 201, as shown in FIG. 9.

The cushioning member 205 is compressed by the cushioning member contact base 126, when the first housing 110 and the second housing 120 relatively moves to close to each other. Thus, by such compression of the cushioning member 205, the relative movement between the first housing 110 and the second housing 120 is buffered.

The striking tool 100 according to the representative embodiment further comprises a stopper 204.

The stopper 204 receives the bifurcated member 192 of the second housing 120 side and thus, the stopper 204 defines the maximum distance (namely the maximum strokable distance) of the relative movement in the first direction D1 between the first housing 110 and the second housing 120.

(Disposing a Plurality of Slide Guide Members)

According to the representative embodiment, with respect to the first direction D1, the first slide guide member 190 defines the handle near side slide guide member, while the second slide guide member 200 defines the handle remote side slide guide member.

By supporting the relative movement of the first housing 110 and the second housing 120 with a plurality of the slide guide members, stability of the operation can be enhanced.

Further, as shown in FIG. 8 and FIG. 9, because a plurality of the first slide guide members 190 and a plurality of the second slide guide members 200 are respectively disposed around the first direction D1, the relative movement between the first housing 110 and the second housing 120 can further be secured.

(Vibration Reducing Structure)

As is shown in FIG. 4 and FIG. 7, the first housing 110 and the second housing 120 can relatively move in the first direction D1 to close to each other and to go way from each other by the intervention of the first elastic member 161 and the second elastic member 162.

Each of the first elastic member 161 and the second elastic member 162 is provided with a coil spring made of metal. Otherwise, for example, a leaf spring, a rubber, a soft resin or an actuator can be adopted.

The first elastic member 161 is disposed between the first housing 110 and the second housing 120 at the first direction lower side D1D lower than the handle 130. According to the representative embodiment, the first elastic member 161 is provided in pair.

As shown in FIG. 7, the lower end portion of the first elastic member 161 is connected to a first elastic member mounting base 120A provided at the upper side drive mechanism housing part 111.

On the other hand, the upper end portion of the first elastic member 161 is contacted with the pushing base 120C, while the upper end portion of the first elastic member 161 is in a free end state.

The pushing base 120C has a L-shaped cross section in a front view in FIG. 7. And the bottom part of the L-shaped cross section is engaged with the upper end portion of the first elastic member 171. On the other hand, the upper end of the L shaped cross section is disposed to oppose to the bifurcated member 192 at the first housing 110 side.

The upper end portion of the pushing base 120C and the bifurcated member 192 of the first slide guide member 190 are disposed to oppose to each other by a predetermined clearance 190CL, before the striking operation is started (an initial state). In this representative embodiment, the clearance 190CL is set as 2 millimeter (2 mm).

When the first housing 110 relatively moves to the first direction lower side D1D to close to the second housing 120, the bifurcated member 192 goes down by a distance corresponding to the clearance 190CL along the pipe shaped member 191. Then, the bifurcated member 192 contacts with the upper end portion of the pushing base 120C of the first elastic member 161.

Further, because the first housing 110 relatively moves to the first direction lower side D1D, the bifurcated member 192 compresses the first elastic member 161 by means of the pushing base 120C. As a result, the biasing force exerted in accordance with the compression of the first elastic member 161 acts between the first housing 110 and the second housing 120.

The first elastic member 161 is disposed between the first slide guide member 190 as the near (closer) side to the handle 130 and the second slide guide member 200 as the remote side to the handle 130 in the first direction D1.

Therefore, the biasing force can be applied in a state that the first elastic member 162 is held by both ends thereof such that any adverse affection by force in a direction other than the first direction D1 can be prevented (for example, tilting force during the relative movement).

Further, the first elastic element 161 is disposed right (just) below the first slide guide member 190 in the first direction D1 and thus, vibration reduction effect to the handle 130 can be enhanced.

On the other hand, the second elastic member 162 according to the representative embodiment is disposed between the first housing 110 and the second housing 120 at the first direction upper side D1U higher than the handle 130.

Figure 10:
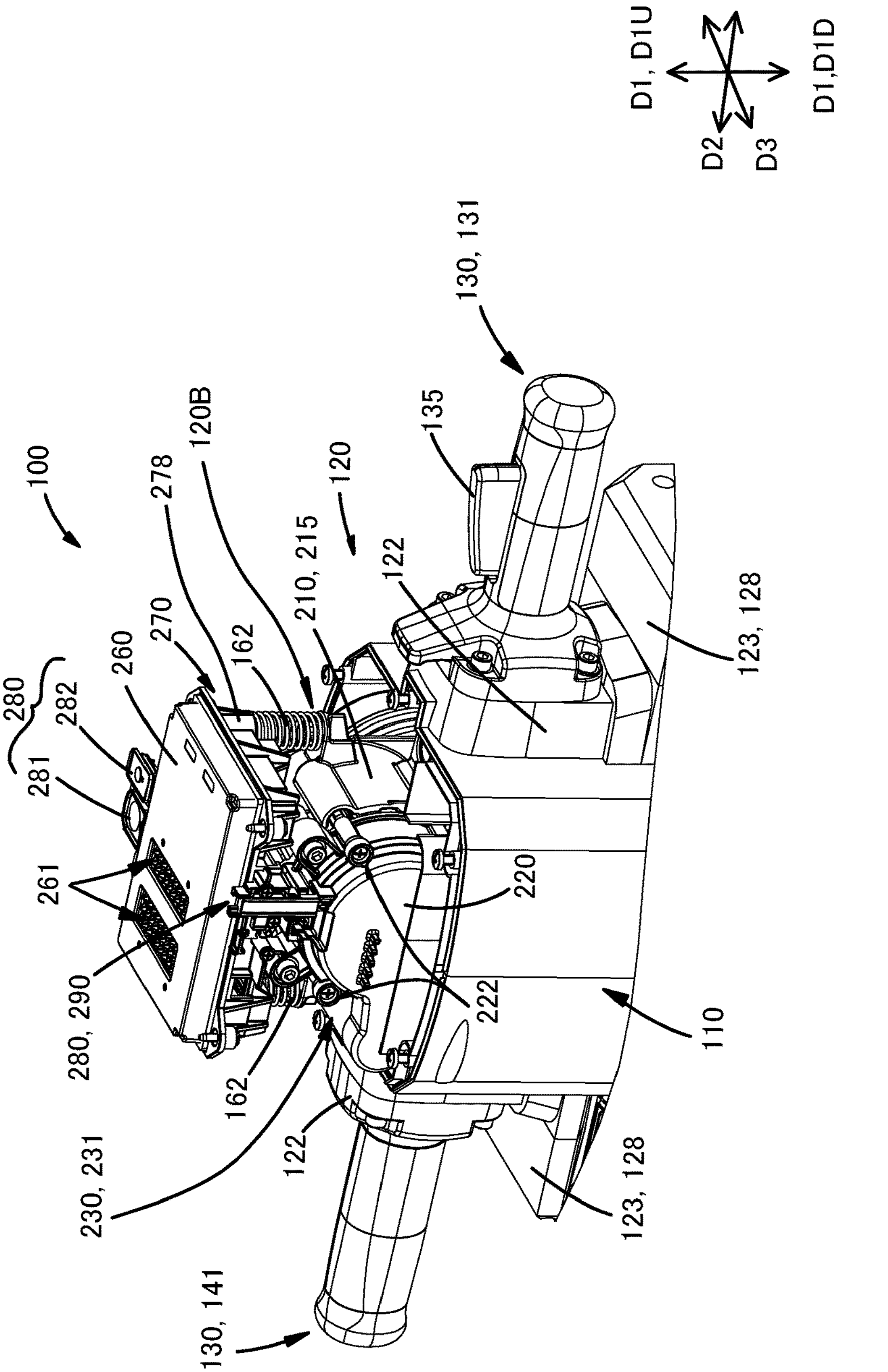
FIG. 10 shows a front right side perspective view showing the upper inner structure of the striking tool according to the representative embodiment in a state that a head case is detached.
Figure 12:
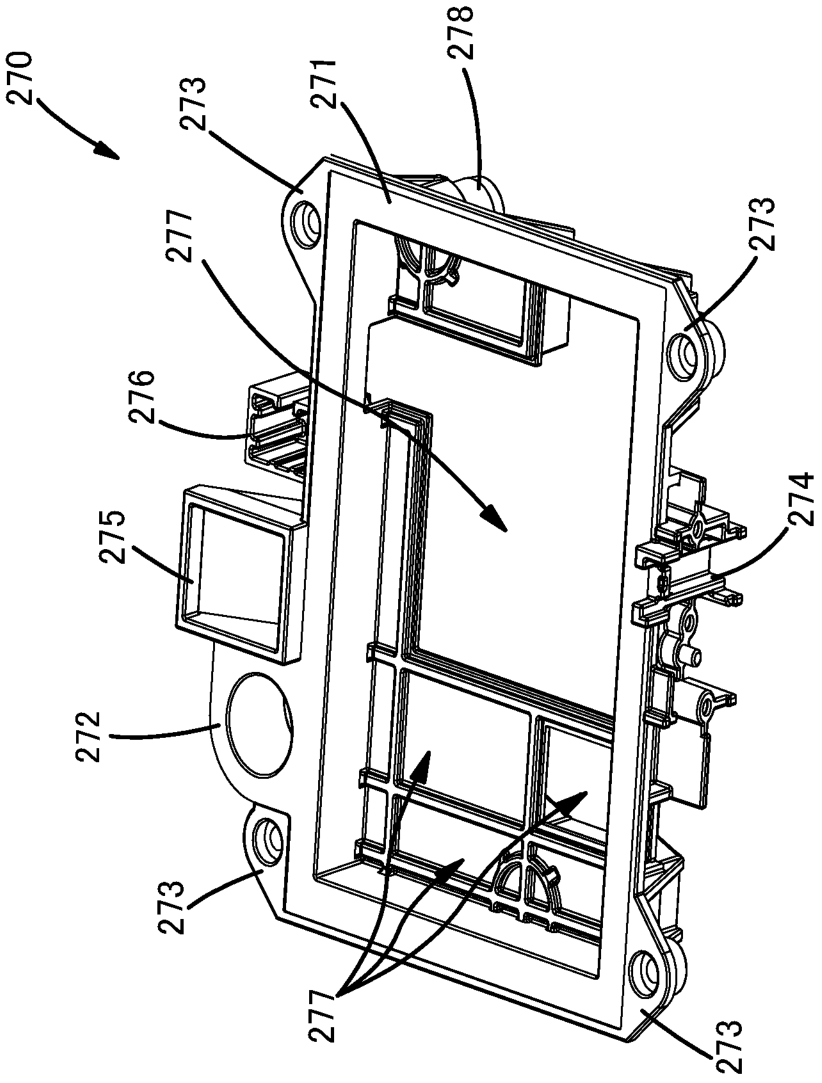
FIG. 12 shows an upper face side perspective view showing the structure of a controller case.
Figure 13:
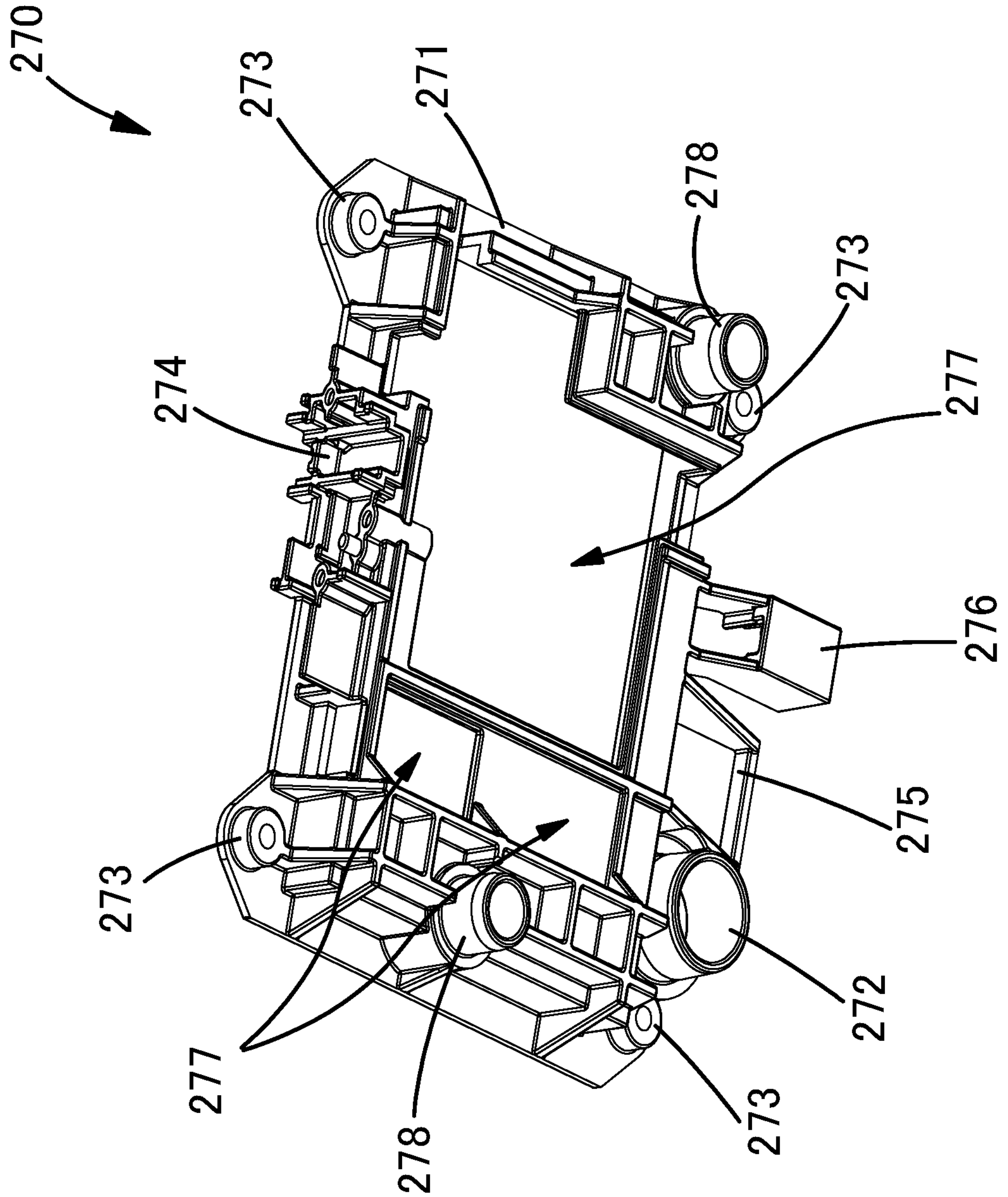
FIG. 13 shows a bottom face side perspective view showing the structure of the controller case.

The second elastic member 162 is formed in pair (also see e.g. FIG. 10). The one side ends of the respective second elastic members 162 are secured to a second elastic member mounting portion 278 of the controller case 270 (at the second housing 120 side). Note that the detailed structure of the controller case 270 is also shown in FIG. 12 and FIG. 13.

On the other hand, the other side ends of the respective second elastic members 162 (the first direction lower side D1D side) is secured to the second elastic member mounting base 120B (at the first housing 110 side).

As a result, the second elastic member 162 is disposed to intervene between the first housing 110 and the second housing 120.

When the user of the striking tool 100 holds and pushes the handle 130 to the first direction lower side D1D, the second housing 120 integrally formed with the handle 130 closes to the first housing 110 by relatively moving to the first direction lower side D1D in a state to oppose to the biasing force of the second elastic element 162.

The first elastic member 161 and the second elastic member 162 are arranged such that the elastic coefficient (the elastic constant or the elastic modulus) of the first elastic member 161 is larger than the elastic coefficient of the second elastic member 162.

Specifically, the elastic coefficient of the first elastic member 161 (a coil spring is adopted in this representative embodiment) is set to be relatively larger enough to secure the vibration reducing function of the striking tool; such that the vibration generated at the first housing side 110 during the striking operation is effectively prevented from being transmitted to the second housing 120 side.

On the other hand, the elastic coefficient of the second elastic member 162 is set such that:

(1) in a case that the striking operation is not performed, the elastic coefficient should correspond to the total weight of the second housing 120, functional members mounted to the second housing 120 and the battery 150 in order that these weights of the second housing 120 can be remotely held form the first housing 110.

(2) in a case that the striking operation is started, the elastic coefficient should correspond to the force that the user pushes the handle 130 in the first direction lower side D1D to relatively move the second housing 120 to the first housing 110 side. In other words, the elastic coefficient should correspond to the degree that the user can easily manually push the second housing 120 to the first housing 110. Thus, the elastic coefficient of the second elastic member 162 is set having regard to these aspects.

(Inner Structure of the First Housing 110 in a State that the Head Case 121 is Detached)

Figure 11:
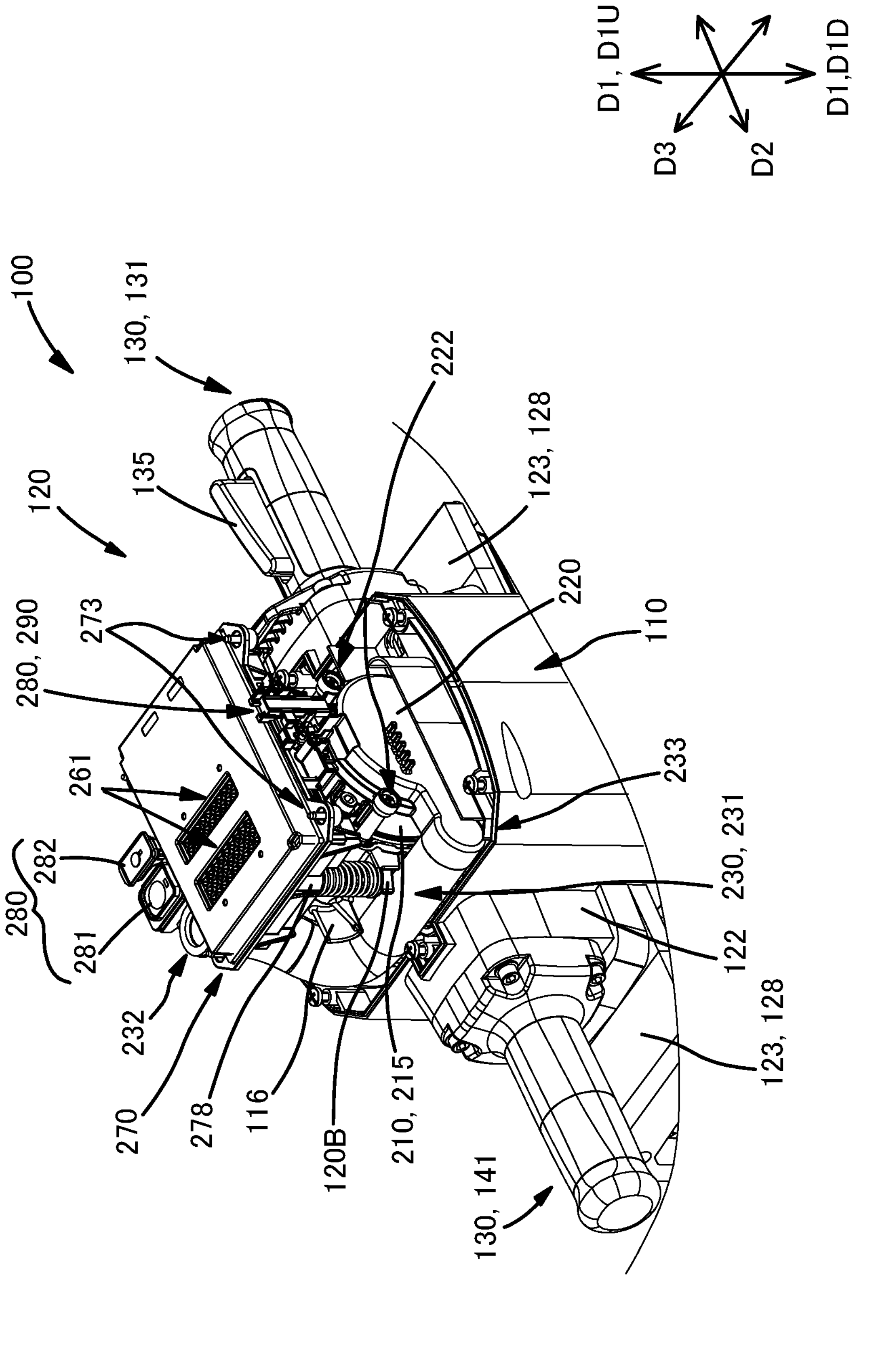
FIG. 11 shows a front left side perspective view showing the upper inner structure of the striking tool according to the representative embodiment in a state that a head case is detached.

The inner structure of the upper side of the striking tool 100 is shown in FIG. 10 and FIG. 11 in a state that the head case 121 shown in FIG. 1 is detached.

FIG. 10 shows the upper inner structure of the striking tool 100 as a front right side view in a state that the head case 121 is detached.

On the other hand, FIG. 11 shows the upper inner structure of the striking tool 100 as a front left side view in a state that the head case 121 is detached.

At the first direction lower side D1D, the second housing 120 connected to the first housing 110 holds the controller 260, the control case 270 that holds the controller 260, the main electric switch 281, the communication unit 282 and the detection mechanism 290.

The controller 260 is a member which mainly performs the driving control of the above-explained motor 260. The controller 260 is formed as a control board assembly body in which the control board is housed and a heat dissipation fin 261 is provided on the upper side. The control board mainly comprises a CPU and a memory and so on.

Each of the main electric switch 281, the communication unit 282 and the detection mechanism 290 respectively defines the functional member 280 for assisting the striking operation of the striking tool 100.

The second housing 120 which holds the above-explained various members is connected to the first housing 110 with the intervention of the second elastic member 172. In other words, the second housing 120 is connected to the first housing 110 via the second elastic member 172. The biasing force of the second elastic member 162 is exerted both onto the first housing 110 and the second housing 120 in the first direction D1.

On the other hand, the first housing 110 holds the motor housing 215 which houses the motor 210 at the upper end portion of the first direction upper side D111. The motor housing 215 is connected with the duct cover 220. The duct cover 220 is, as is also shown in FIG. 6, connected to the motor housing 215 at one end portion region opposing to the cooling fan 214 of both end portions of the output shaft 214 of the motor 210.

Hereinafter, the detailed structures of the respective members of the striking tool 100 are explained in order.

(Structure of the Controller Case 270)

The detailed structure of the controller case 270 is shown in FIG. 12 and FIG. 13. FIG. 12 is an upper face side perspective view of the controller case 270. FIG. 13 is a bottom face side perspective view of the controller case 270.

The controller case 270 is mainly formed by a frame 271 which functions as a holding member of the controller 260. The frame 271 is integrally provided with a duct member mounting portion 272, a head case mounting portion 273, detection mechanism mounting portion 274, a main electric switch mounting portion 275, a communication unit mounting portion 276, a wire harness insertion opening 277 and a second elastic member mounting portion 278.

Further, while it is not explicitly shown in the drawings, a lead wire (an electric wire) is inserted to, and held, by the wire harness insertion opening 277. The lead wire electrically connects the controller 260 with the battery 150, motor 210 and the electrical switch 136 and so on. A single or a plurality of lead wire(s) as a bundle can be adopted.

(Structure of the Duct Cover 220)

Figure 14:
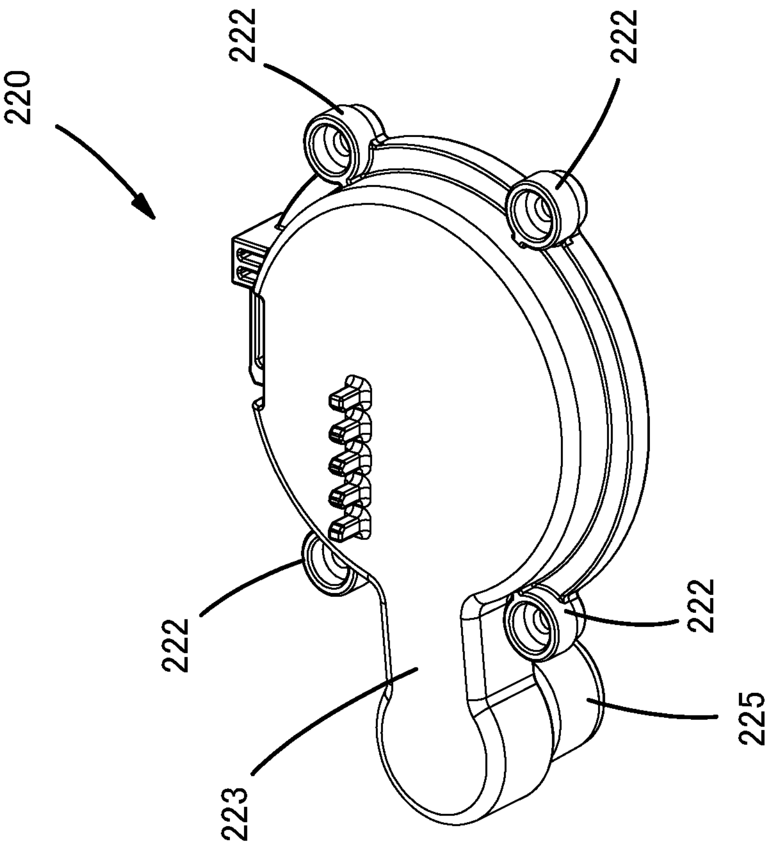
FIG. 14 shows a perspective view showing the structure of a duct cover.
Figure 15:
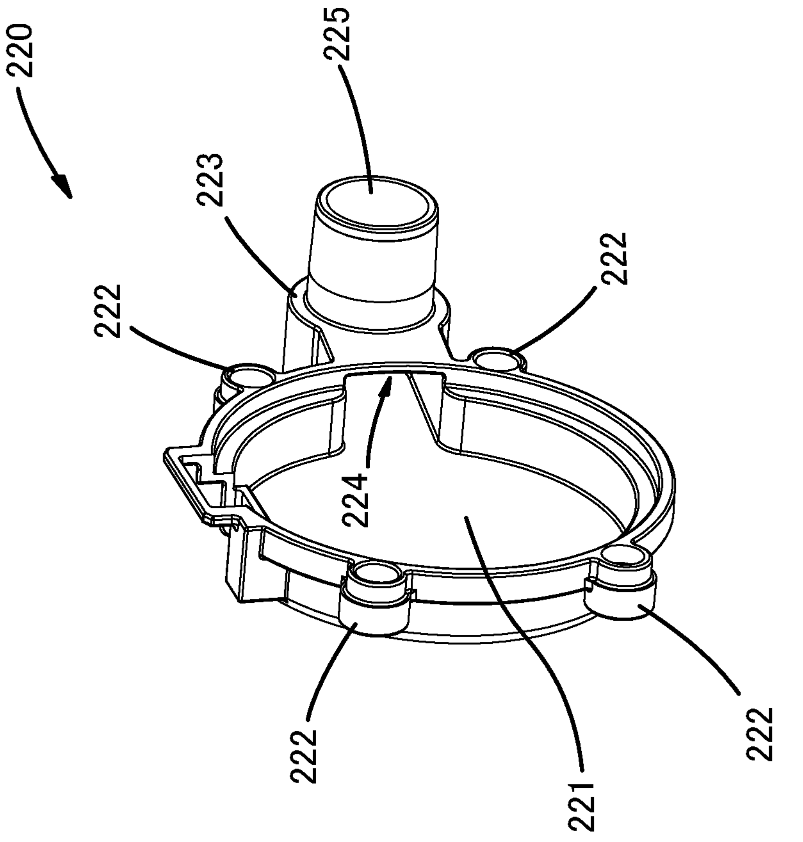
FIG. 15 shows a perspective view of the structure of the duct cover viewing from the motor as a member to be attached.

The detailed structure of the duct cover 220 is shown in FIG. 14 and FIG. 15 as a perspective view.

FIG. 14 is a front side perspective view of the duct cover 220. FIG. 15 is a perspective view of the duct cover as viewed from the motor 210.

The duct cover 220 comprises an inner space 221, a motor mounting base 222, a flange 223, a cooling air guide passage 234 and a duct member mounting portion 225. The cooling air which cooled the controller 260 is introduced to the motor 210 through the duct member mounting portion 225, the cooling air guide passage 224 and the inner space 221 of the duct cover 220 (also see FIG. 11).

The duct cover 220 structured as such is fixedly screwed to the motor housing 215 by utilizing the motor mounting base 222 (also see FIG. 10 and FIG. 11).

As shown in FIG. 6, the duct cover 220 is connected to the motor housing 215 at the end portion side of the output shaft 213 of the motor 210 opposing to the end portion at which the cooling fan 214 is mounted with respect to the third direction D3. Therefore, when the cooling fan 214 rotates together with the output shaft 213, the cooling air is sent to the motor housing 215 by means of the function of the axial flowing of the cooling fan 214 via the duct member mounting portion 225, cooling air guide passage 224 and the inner space 221 within the duct cover 220 as shown in FIG. 15. Further, the cooling air is moved along the output shaft 213 within the motor housing 215 in the third direction D3. As a result, the motor 210 housed in the motor housing 215 is cooled.

(Structure of the Duct Member 230)

Figure 16:
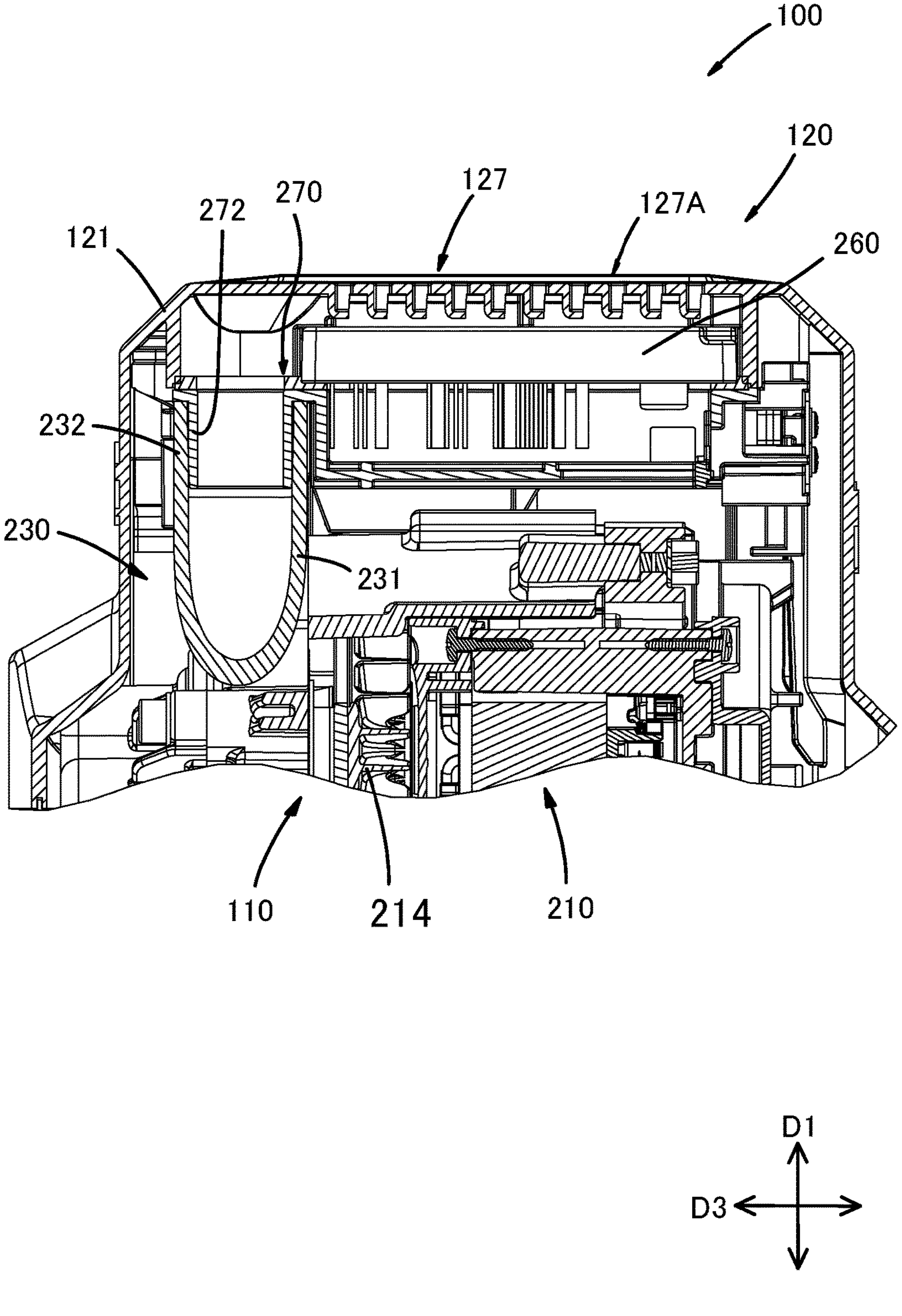
FIG. 16 shows a left-side face (partly sectional) view showing the attaching structure of the duct member.
Figure 17:
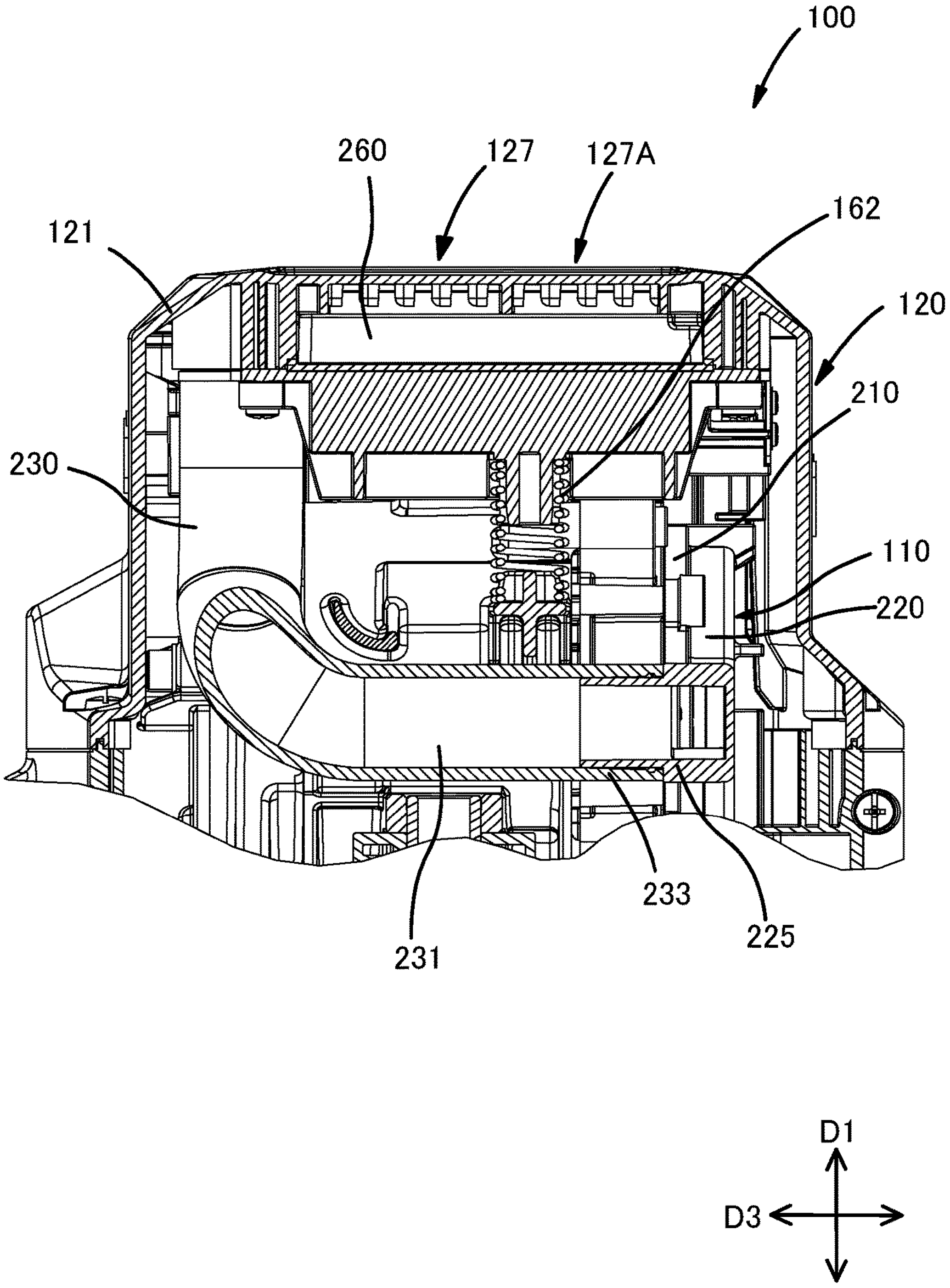
FIG. 17 shows a left-side face (partly sectional) view showing the attaching structure of the duct member.

The detailed structure of the duct member 230 is shown in FIG. 11, FIG. 16 and FIG. 17.

FIG. 16 is a left side face as seeing the cross section in the second direction D2 as cutting in the first direction D1 in line with the central axis of the first end portion 232 of the duct hose 231 in FIG. 11.

FIG. 17 is a left side face as seeing the cross section in the second direction D2 as cutting in the first direction D1 in line with the central axis of the second end portion 233 of the duct hose 231 in FIG. 11.

The duct member 230 is a member to serve the cooling air which cooled the controller 260 to the motor housing 215. The duct member 230 is mainly provided with a duct hose 231.

The duct hose 231 is arranged that the first end portion 232 of the duct hose 231 is connected with the duct member mounting portion 272 of the controller case 270 (also see FIG. 12 and FIG. 13). The second end portion 233 of the duct hose 231 is connected with the duct member mounting portion 225 of the duct cover 220.

As a result, the duct member 230 is disposed to intervene between the first housing 110 and the second housing 120.

As shown in FIG. 16, the first end portion 232 of the duct hose 231 is directly and fittingly connected to the duct member mounting portion 272 of the controller case 270. In other words, the first end portion 232 is direly fitted to the duct member mounting portion 272 without utilizing any assistant members such like an adapter (namely, adapter non-intervening state).

Further, as shown in FIG. 17, the second end portion 233 of the duct hose 231 is directly and fittingly connected to the duct member mounting portion 225 of the duct cover 220 which is coupled to the motor 210 In other words, the second end portion 233 is direly fitted to the duct member mounting portion 225 without utilizing any assistant members such like an adapter (namely, in an adapter non-intervening state).

The duct hose 231 of the representative embodiment 231 is provided with a member in which biasing force applies for the compression. Thus, when the duct hose 231 is stretched form a predetermined initial state, the duct hose 231 is biased to the compression side so as to return to the initial state. According to the representative embodiment, a hose with a bellows structure is adopted to the duct hose 231.

In the representative embodiment, the duct hose 231 is disposed between the first housing 110 and the second housing 120 in a state that the duct hose 231 is stretched in advance by a predetermined amount from the initial state. As a result, the duct hose 231 is always biased to the compression side so as to return to the initial state.

Thus, because the duct hose 231 is always biased to be compressed, the duct hose 231 is prevented from coming loose. Therefore, when the first housing 110 and the second housing 120 relatively move to each other, the duct hose 231 can be prevented from being rubbed to wear against other component members.

Specifically, when the vibration reduction mechanism functions, the connecting distance by the duct hose 231 between the first housing 110 and the second housing 120 becomes shorter than the connecting distance in the initial state. In this case, if no biasing force for the compression is applied to the duct hose 231, the duct hose 231 may possibly be loosen due to the shortened connecting distance. This will cause an abrasion with other component member(s). On the other hand, according to the representative embodiment, the duct hose 231 is provided to be biased to the compression side to return to the initial state and as a result, such problem can effectively be avoided.

Further, as shown in FIG. 11, the first end portion 232 of the duct hose 231, namely the end portion at the controller case 270 side as is the first direction upper side D1U, is provided with a cross section to be defined by a face extending in the second direction D2 and the third direction D3. In other words, the central axis at the upper end side of the duct hose 231 extends in the first direction D1.

On the other hand, the second end portion 233 of the duct hose 231, namely the end portion at the duct cover 220 side as is the first direction lower side D1D, is provided with a cross section to be defined by a face extending tin the first direction D1 and the second direction D2. In other words, the central axis at the lower end side of the duct hose 231 extends in the third direction D3.

As a result, the cross section of the first end portion 232 and the cross section of the second end portion 233 respectively intersects. Namely, the central axis of the first end portion 232 extends in the first direction D1 and the central axis of the second front end portion 233 extends in the second direction D2 and thus, both central axes are respectively cross (substantially perpendicularly cross). This structure is especially effective to avoid twisting and unfavorable tensioning of the duct hose 231 when the duct hose 231 is disposed to connect the first housing 110 and the second housing 120, the relative distance of which can be changed for the vibration reduction.

The first end portion 232 of the duct hose 231 is disposed in the vicinity of the upper region of the cooling fan 214 of the motor 210 (see also FIG. 4 and FIG. 5).

Further, as shown in FIG. 16 and so on, a cooling air intake port 127A is provided to correspond to the end portion of head case 121 opposing to the duct portion mounting portion 272 of the controller case 270. The cooling air can flow in a long run from the cooling air intake port 127A to the first end portion 232 of the duct hose 231 attached to the duct member mounting portion 272 positioned at the opposing end portion. As a result, the cooling effect of the controller 260 can be enhanced.

Note that, in the representative embodiment, the cooling air intake port 127 is provided not only at the end portion opposing to the duct member mounting portion 272 but also at the center region of the top surface of the head case 121 and intake efficiency of the cooling air is further enhanced.

Further, as shown in FIG. 11, the duct hose 231 is curved around at the central region and this curving shape is kept by utilizing the duct member guide rib 116 disposed on the motor housing 215.

(Structure of Functional Members 280)

The representative embodiment comprises, as shown in FIG. 3, FIG. 10 and FIG. 11, the main electric switch 281, the communication unit 282 and the detection mechanism 290 as examples of the functional members 280 for assisting the striking operation by the striking tool 100.

The main electric switch 281 is a starting switch to turn on the striking tool 100 to the energized state. When the user manually operates the main electric switch 281 to the on-position, the on-position is basically kept till the user's manual operation to the off-position.

Note that, in this representative embodiment, due to energy saving reason, the main electric switch 281 is automatically returned to off-position if non-operating state is continued for 60 seconds after tuning on to the on-position.

Further, when the main electrical switch 281 is turned on to the on-position, operation lamp is turned on such that the switching state is visible to the user.

The communication unit 282 is a member to send a drive control signal to the attachment members (accessory members) for serving the striking operation together with the striking tool 100.

As the attachment members, a duct collecting device is utilized according to the representative embodiment.

As to the communication way, Wi-Fi or Bluetooth can be used.

(Structure of the Detection Mechanism 290)

Next, the structure of the detection mechanism 290 as one of the component elements of the above-explained functional members 280 is explained.

Figure 18:
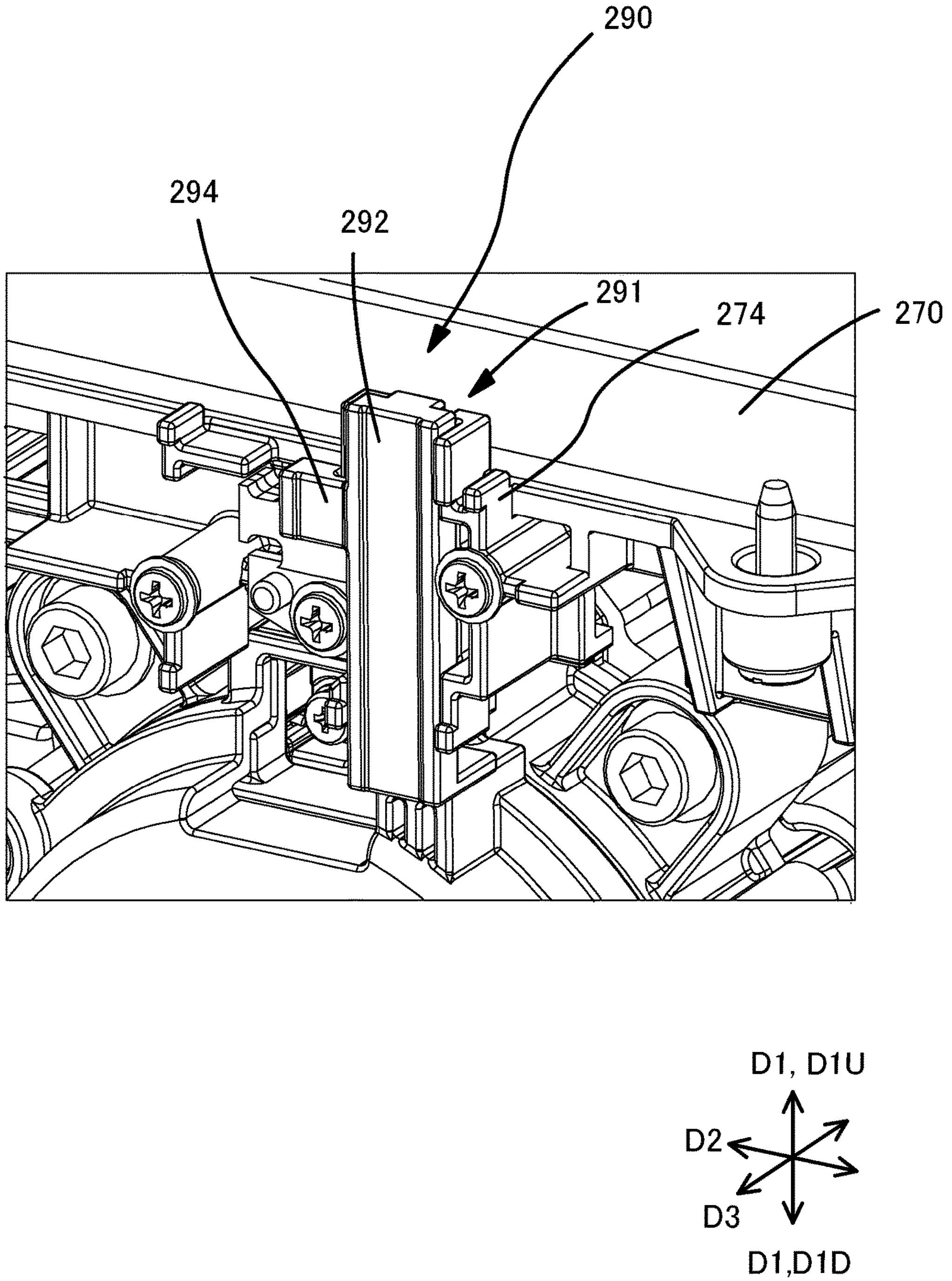
FIG. 18 shows a perspective view showing the structure of a detecting mechanism.
Figure 19:
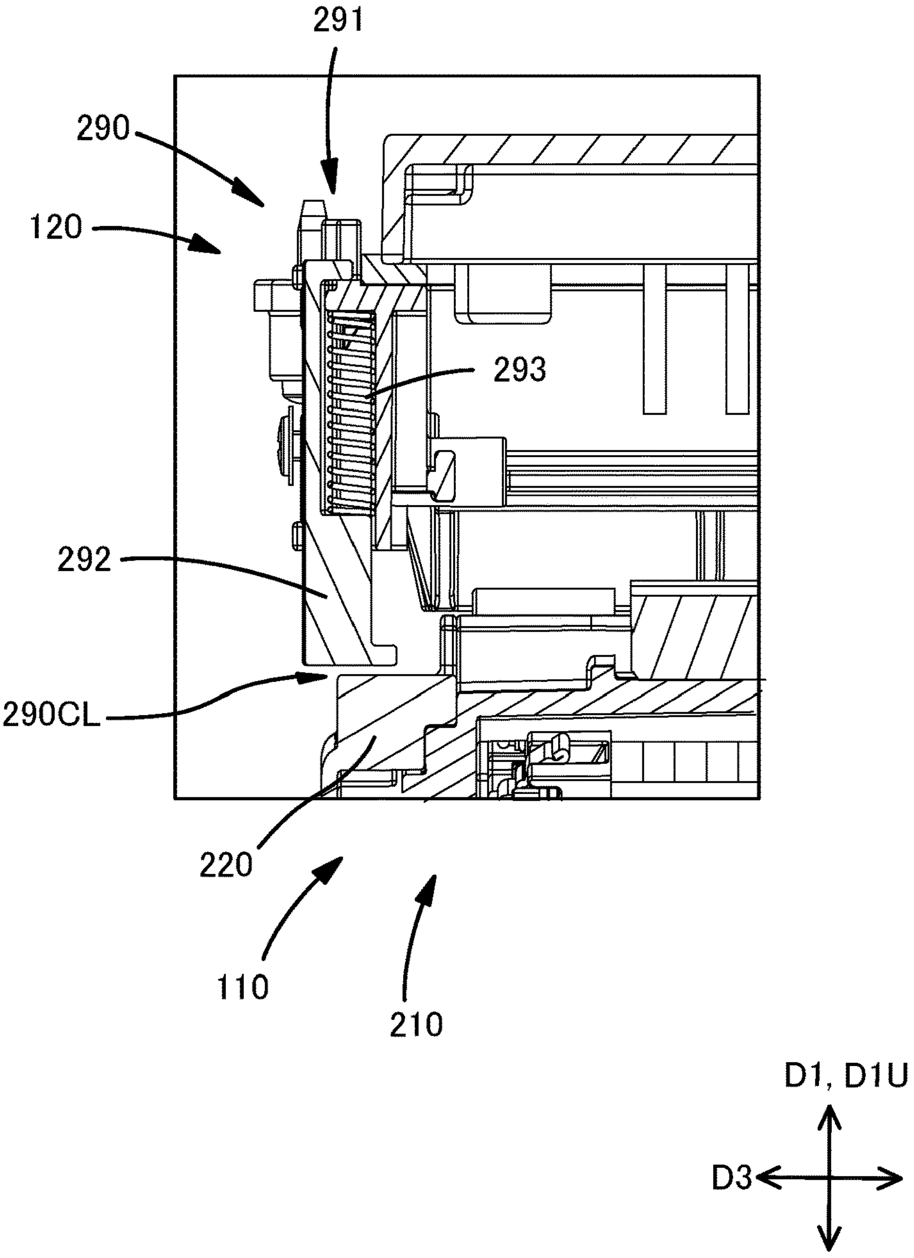
FIG. 19 shows a right-side face partly sectional view showing the structure of the detecting mechanism as the striking tool is in a non-load driving state.

Basic structure of the detection mechanism 290 is shown in FIG. 18 and FIG. 19.

The detection mechanism 290 comprises an assembly body main part 291, a movable member 292 to which a magnetic body is provided, a movable member biasing elastic body 293 and a magnetic-typed sensor 294.

The detection mechanism 290 is mounted to the detecting mechanism mounting portion 274 of the controller case 270 (see also FIG. 12 and FIG. 13).

Further, the detection mechanism 290 is connected to the controller 260 by the wire harness (not shown in drawings).

The movable member 292 is movable in the first direction D1 in a state that the movable member 292 is held by the assembly body main part 291. The movable member biasing elastic body 293 is disposed to intervene between the movable member 292 and the assembly body main part 291. The movable member biasing elastic body 293 always exerts biasing force to the movable member 292 to the first direction lower side D1D.

As shown in FIG. 19, the lower end portion of the movable member 292 faces the upper end portion of the duct cover 220. A clearance 290CL is formed between the movable member 292 and the duct cover 220. In the representative embodiment, the clearance 290CL is set as 1 millimeter (1 mm), In this representative embodiment, the state that the sensor 294 detects the magnetic is maintained when the striking tool 100 is in the initial state. In other words, the controller 260 defines the state that that the sensor 294 detects the magnetic as the initial state of the striking tool 100.

Figure 20:
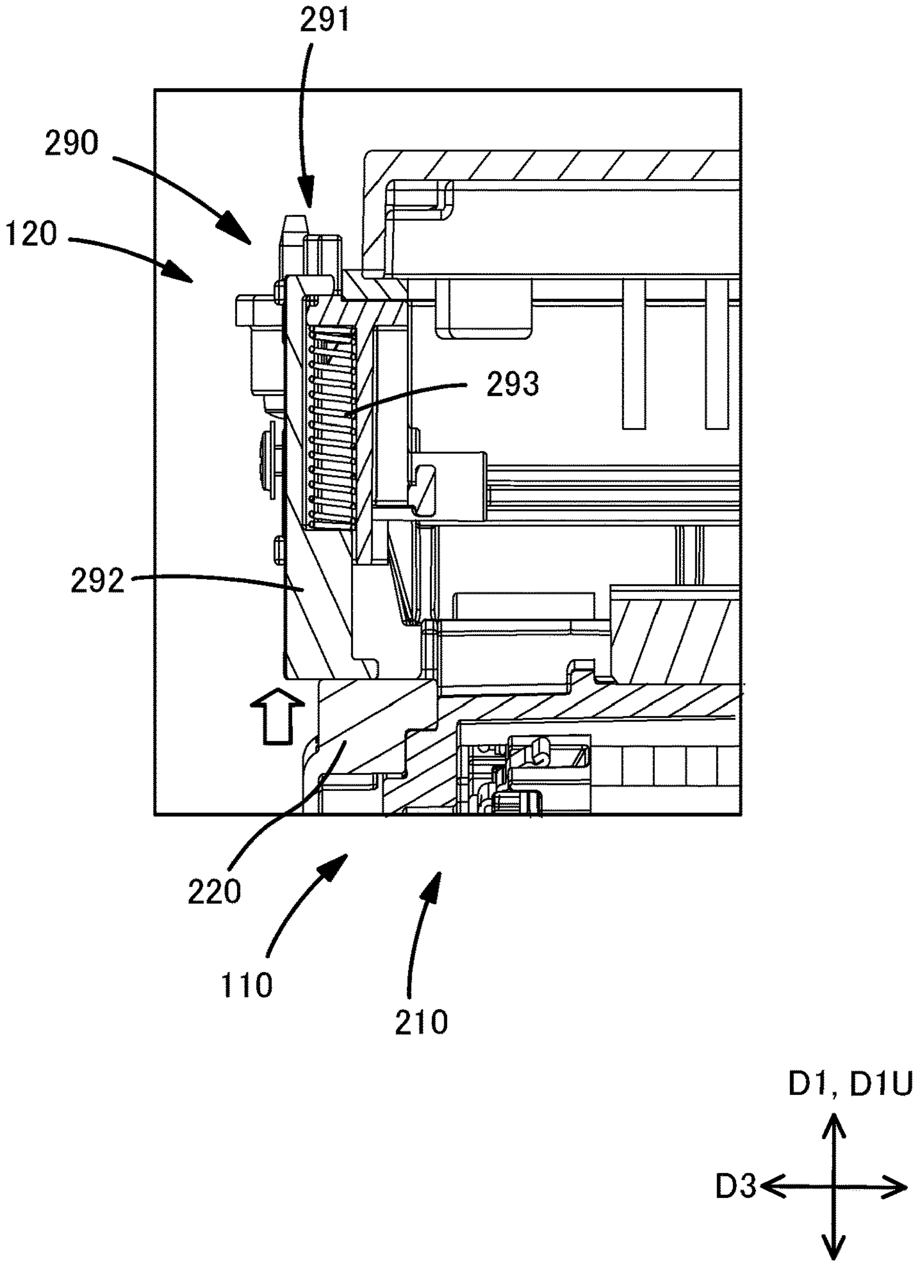
FIG. 20 shows a right-side face sectional view showing the operating state of the detecting mechanism when the detecting mechanism is switched from the non-loaded driving state to the loaded driving state.

On the other hand, as shown in FIG. 20, when the first housing 110 and the second housing 120 relatively moves to close to each other, the clearance 290CL is lost (disappeared) and thus, the lower end portion of the movable member 292 contacts with the upper end portion of the duct cover 220.

When the first housing 110 and the second housing 120 relatively moves further to close to each other from such state of the contact, the duct cover 220 pushes the movable member 292 up to the first direction upper side D1U, opposing to the biasing force of the movable member biasing elastic body 293.

By the movable member 292 goes up to the first direction upper side D1U, the sensor 294 comes not to detect the magnetism (magnetism detection is cancelled). As a result, the controller 260 detects the pushing operation at the striking tool 100.

This is, the detection mechanism 290 functions as a push drive sensor. According to the representative embodiment, the striking tool 100 is switched from the non-loaded driving state to the loaded driving state b the detection of such pushing operation. The details of this operation will be explained later.

(Operation of the Striking Tool 100 According to the Representative Embodiment)

Hereinafter, operation of the striking tool 100 according to the representative embodiment is explained.

The striking tool 100 is defined by a so-called large hammer (large sized hammer). The striking tool 100 is arranged such that usual operation is defined as a striking operation to the downward in a state that the striking tool 100 is downwardly dropped by the own weight of the striking tool 100.

Note that the terms of "downwardly drop" and "downward" are not limited to the first direction D1D but can comprise direction other than the first direction D1D.

(Turning on of the Motor 210 and Soft Non-Loaded Start)

In order to conduct a striking operation by using the striking tool 100, the user hold the handle 130 and have the striking tool 100 drop downward by the own weight of the striking tool 100 (a state that the tool holder 230 heads in the first direction lower side D1D). Then, the user manually turns the main electric switch 281 on.

Further, the user, holding the handle 130, manually turns the trigger 135 on.

Based on the turning on of the main electric switch 281 and the trigger 135, the controller 260 drives the motor 210 to rotate at a predetermined first speed R1 (first rotating speed).

As to the specific value of the first speed R1, it can be decided, for example, based on an idling setting such that the electricity consumption can be effectively saved but the striking tool 100 can smoothly be switched to increase to the normal driving operation (loaded driving state) from the idling state. And as the first speed R1 is set at relatively low speed, the vibration generated at the striking tool 100 can be alleviated by means of the vibration reducing mechanism 177. This aspect is explained later.

According to the representative embodiment, only when both the main electric switch 281 and the trigger 135 are turned on, the motor 210 can be energized. The reason of this is for securely prevent any malfunctions of the striking tool 100. Further, for a thorough prevention of the malfunction, the motor 210 is not energized if the trigger 135 is turned on before the main electric switch 281 is turned on.

In the representative embodiment, a blushless motor is adopted for the motor 210. Thus, when both the main electric switch 281 and the trigger 135 are turned on, the motor 210 is controlled by the so-called PWM (Pulse width modulation) control.

(Definition of the Non-Loaded Driving State of the Striking Tool 100)

According to the representative embodiment, a state that the motor 210 is driven and the second housing 120 is not pushed to the first housing 110, is defined as "non-loaded driving state".

This non-loaded driving state can also be defined as:

(1) an initial state before the striking operation begins, (2) a state that no load except for the own weight of the striking tool 100 is applied, namely a state that the end tool is not intentionally (willingly) pushed to the work and no load is applied except for the own weight, or (3) a state that the used does not push the handle 130, namely a state that no relative movement takes place between the first housing 110 and the second housing, or a state that both the first elastic member 161 and the second elastic member 162 are not compressed.

When the motor 210 is driven to rotate, as shown in FIG. 5 and FIG. 6, the rotating output of the output shaft 213 of the motor 210 around the third direction D3 is transferred to the first intermediate shaft 171 and to the second intermediate shaft 172 and then, converted to the linear movement in the first direction D1 by the crank mechanism 173. Thus, the piston 175 linearly moves in the first direction D1 within the cylinder 174. As the same way, the vibration reducing mechanism 177 mainly provided with the counter weight 178 linearly moves in the first direction with a different phase.

When the striking tool 100 is in the non-loaded driving state, the impact bolt 182 moves to the front side of the tool holder 240 in the first direction lower side D1D by the own weight from the position as shown in FIG. 5 and FIG. 6. At the same time, the striker 181 also moves to the front side of cylinder 174 in the first direction lower side D1D by the own weight so as to close to the impact bolt 182. In other words, in the non-loaded state, the impact bolt 182 and the striker 181 drops downward by the respective own weight to the first direction lower side D1D.

In this state, because the striker 181 is positioned at the front end side in the cylinder 174, the air chamber 176 within the cylinder 174 is communicated to the outside via the ventilation hole 174A. Therefore, though the piston 175 is driven to reciprocate, no pressure fluctuation takes place in the air chamber 176 and the striker is not moved.

Note that FIG. 6 shows, for the sake of convenience, the state to the contrary that the air chamber 176 is not communicated to the outside via the ventilation hole 174A. Such a state defines the loaded driving state (explained later).

In this state, the controller drives the motor to rotate at the predetermined first speed R1. The first speed R1 is set relatively at low speed mode, the driving speed of the vibration reducing mechanism 177 also becomes relative lower and as a result, useless vibration generated by the vibration reducing mechanism 177 can be alleviated at minimum.

According to the representative embodiment, this state is defined as "soft no-load start" or "soft non-loaded start" such that the motor 210 is driven at the first speed R1 as relatively low speed mode in the non-loaded driving state.

The soft no load start can be defined as a state (1) to minimize the vibration caused by the vibration reducing mechanism 177 and (2) to improve the response characteristic from the idling mode to the normal driving mode.

In this representative embodiment, the first speed R1 is set at relatively low speed. On the other hand, the first speed R1 can be set at zero. In other words, the motor 210 can be stopped in the non-loaded driving state. In such a case, instead of improving the starting response, the energy saving and vibration free structure can be obtained.

When the striking tool is in a non-loaded driving state, following characteristics can be provided:

(1) The first elastic member 161 as shown in FIG. 7 is in a non-compression state, namely in a biasing force non-exerting state. The clearance 190CL is given between the bifurcated member 192 of the first slide guide member 190 and the pushing base 120C (2 mm in this representative embodiment).

(2) The second elastic member 162 as shown in FIG. 7 is in a non-compression state, namely in a biasing force non-exerting state.

(3) With respect to the detection mechanism 290 as shown in FIG. 19, the clearance 290CL (1 mm in this representative embodiment) is given between the movable member 292 and the duct cover 220.

(Driving Operation 2 of the Striking Tool 100: Switching from the Non-Loaded Driving Status to the Loaded Driving Status)

With respect to the striking tool 100 in the non-loaded driving status, the user pushes the handle 130 to the first direction lower side D1D and the second housing 120 integrally coupled to the handle 130 comes to close to the first handle 110 at the first direction lower side D1D.

Then, the controller case 270 as one of the component members of the second housing 120 also moves to the first direction lower side D1D. As a result, the second elastic member 162 is compressed by means of the second elastic member mounting portion 278 as shown in FIG. 7.

The second elastic member 162 in a compressed state applies biasing force both to the first housing 110 and the second housing 120.

On the other hand, with respect to the first elastic member 161, the bifurcated member 192 of the second housing 120 does not reach the pushing base 120C of the first elastic member 161, due the clearance 190CL (2 mm in this representative embodiment) as shown in FIG. 7. Therefore, the first elastic member 161 is in a non-compressed state, namely in a biasing force non-exerting state. In other words, the clearance 190CL defines "initial action distance" for applying the biasing force only to the second elastic member 162, while the first elastic member 161 is in the biasing force non-exerting state.

On the other hand, with respect to the detection mechanism 290 as is shown in FIG. 19, when the second housing 120 moves to the first direction lower s/ide D1D, the detection mechanism 290 entirely moves to the first direction lower side D1D by the clearance 290CL (1 mm) to the duct cover 220. Then, the lower end portion of the movable member 292 comes to contact with the duct cover 220.

When the second housing 120 further moves to the first direction lower side D1D, the movable member 292 is pushed by the duct cover 220 which relatively close to the movable member 292 opposing to the biasing force of the movable member biasing elastic body 293.

Due to the fact that the movable member 292 moves to the first direction upper side D1D, the detection of the magnetism by the sensor 294 is cancelled. Based upon this cancellation, the controller detects the pushing operation of the second housing 120 to the first housing 110 by means of the detection mechanism 290 and as a result, the non-loaded driving state is switched to the loaded driving state.

(Definition of the Loaded Driving State of the Striking Tool 100)

According to the representative embodiment, a state that motor 210 is driven and the second housing 120 is pushed to the first housing 110, is defined as "loaded driving state".

This Loaded Driving State is:

(1) a state that load other that the own weight of the striking tool 100 is applied to the end tool, namely a state that the end tool is pushed to the work and is driven with the load other than the own weight, and (2) a state that both the first elastic member 161 and the second elastic member 162 are compressed, or a state that at least the second elastic member 162 is compressed and the detection mechanism 290 detects the pushing operation.

In the loaded driving state, the controller 260 drives the motor 210 to rotate at a predetermined second speed R2 (second rotating speed) which is faster than the first speed R1. The second speed R2 is also defined as "normal driving speed" or "usual driving speed".

According to the representative embodiment, based on the detection by the detection mechanism 290, the rotating speed of the motor 210 increases (or switched from the stopping (resting) state to the normal driving speed) and as a result, the non-loaded driving state is switched to the loaded driving state.

In other words, the soft no load is cancelled by the detection of the detection mechanism 290 and the non-loaded driving state is switched to the loaded driving state, namely to the usual driving mode.

The second speed R2 is specifically decided, for example, based on parameters such like a required output of the striking tool 100 at the usual driving operation (loaded driving state), electricity consumption and so on.

As to the switching from the first speed R1 to the second speed R2, it can be selected from or combining immediate switching, sequential switching by the predetermined switching time and/or multi stage step by step switching.

(Operation of the Motion Converting Mechanism 170 and the Striking Mechanism 180 in the Loaded Driving State.)

When the motor 210 is rotated at the second speed R2 in the loaded driving state, the operation of the motion converting mechanism 170 is substantially the same with the operation in the non-loaded driving state except for the speed value. Namely, as shown in FIG. 5 and FIG. 6, the rotating output of the output shaft 213 of the motor 210 around the third direction D3 is transmitted to the first intermediate shaft 171 and the second intermediate shaft 172 and then, converted by the crank mechanism 173 to the linear movement in the first direction D1. As a result, the piston 175 linearly moves within the cylinder 174 in the first direction D1. As the same time, the vibration reducing mechanism 177 mainly comprising the counter weight 178 linearly moves in the first direction D1 around the outer circumference of the cylinder 174.

When the striking tool 100 is in the loaded driving state, the ventilation hole 174A is in a state as shown in FIG. 6, namely in a state not facing the air chamber 176 and thus, air tight state in the air chamber 176 between the piston 175 and the striker 181 is maintained.

Accordingly, in the loaded driving state, by the pressure fluctuation caused by the linear movement of the piston 175 in the cylinder 174, the striker 181 linearly moves in the striking mechanism 180 and drives the impact bolt 182. As a result, the end tool (not explicitly shown in drawings) performs the striking operation. This striking operation is defined as "hammer mode".

In this state, as explained above, while the controller 260 drives the motor 210 to rotate at the second speed R2, the second speed R2 is set at relatively higher speed region. Therefore, efficient striking operation can be performed.

Further, the vibration reducing mechanism 177 is also driven at relatively high speed corresponding to the second speed R2 which is higher than the first speed R1. Therefore, the vibration reducing effect can be kept high against the relatively large amount of vibration generated at the first housing 110 side in the loaded driving state.

(Operation of the Vibration Reducing Handle)

In the loaded driving state, the striking operation is performed in a state that the user holds the handle 130 and pushes the handle 130 to the first direction lower side D1D. In this state, vibration may possible be generated at the first housing 110 side due to the striking mechanism 180 and the striking operation by the end tool.

In this case, due to the vibration, a relative movement takes place between the first housing 110 and the second housing 120. Then, the first elastic member 161 as shown in FIG. 7 applies the biasing force between the first housing 110 and the second housing 120 and as a result, the vibration is prevented from being transferred from the first housing 110 side to the second housing 120 side.

As is explained above, the second housing 120 is integrally provided with the handle 130 for user's grip, the controller 260 for controlling the motor 210, various functional members 280 disposed on the controller case 270, the battery mounting portion 123 and the battery mounted to the battery mounting portion 123. And, by the prevention of transmitting the vibration from the first housing 110 to the second housing 120, the user's burden can be reduced and the controller 260 as precision mechanical equipment, functional members 280 and the battery mounting portion 123 can effectively be protected.

According to the representative embodiment, the movable stroke of the first elastic member 161 is set as 10 mm (10 millimeter). If strong vibration to use the entire movable stroke is exerted, the cushioning member 205 and the stopper 204 works to prevent the first housing 110 and the second housing 120 from directly colliding (see FIG. 7).

Note that when the vibration reducing works in the loaded driving state, following aspects takes place in a precise meaning:

(1) the first elastic member 161 exerts the biasing force, (2) the second elastic member 162 compressed by the use's pushing also exerts the biasing force and (3) the movable member biasing elastic body 293 compressed by the user's pushing also exerts the biasing force.

Each of these biasing forces interacts between the first housing 110 and the second housing 120.

However, the elastic coefficient of the second elastic member 162 is set as relatively small. Further, the elastic coefficient of the movable member biasing elastic body 293 is set as extremely small, because the movable member biasing elastic body 293 is enough only to generate biasing force for tuning the movable member 292 back to the initial position (see FIG. 19).

Therefore, as to the vibration reducing function, the first elastic member 161 which can exert relatively strong biasing force deserves the vibration reduction.

For example, if a single elastic member is used in which the single elastic member detects the pushing operation for switching from the non-loaded driving state to the loaded driving state, and the single elastic member also works to the vibration reduction, following problem would be assumed. Namely, in such a case of using single elastic member, if the elastic coefficient is set as large, the vibration reduction capability can be kept more effective but the necessary pushing force for the user becomes large. To the contrary, if the elastic coefficient is set as small, the necessary pushing force for the user can be optimized but the vibration reduction capability becomes poor.

According to the representative embodiment, the elastic member for the "initial action" to cancel the soft no load driving state (namely the second elastic member 162) is separately provided from the elastic member for the vibration reduction (namely the first elastic member 161). Thus, each elastic member optimally functions for each task.

(Operation of the First Slide Guide Member 190 and the Second Slide Guide Member 200)

According to the striking tool 100, following aspects can be provided such that:

(1) As shown in FIG. 7, the relative movement of the first housing 110 and the second housing 120 is slide-guided at a plural point in the first direction D1 by using the first slide guide member 190 and the second slide guide member 200. Therefore, stable operation can be secured.

(2) As shown in FIG. 7, the first elastic member 161 as functioning the main roll to the vibration reduction is disposed in the first direction D1 between the first slide guide member 190 and the second slide guide member 200. Therefore, stable operation can be secured.

(3) As shown in FIG. 8 and FIG. 9, a plurality of the first slide guide members 190 and a plurality of the second slide guide members 200 are respectively disposed around the first direction D1. Therefore, further stable operation can be secured.

(4) With respect to the material of each component elements of the first slide guide member 190 and the second slide guide member 200, while pipe shaped member 191 made of metal and a sheet metal slide guide 203 are used, the other companion members in pair are made of resin (for example, the bifurcated member 192). Therefore, both strength and light weight can be secured.

(5) Besides the first slide guide member 190 and the second slide guide member 20, the stopper 204 defines the maximum movable distance of the relative movement. Further, in a state of the relative movement less than the maximum movable distance, the cushioning member 205 contiguously cushions the relative movement till reaching the maximum movable distance. Therefore, a rational vibration reduction can be made.

Note that the stopper 204 and the cushioning member 205 can be disposed at least at one of the first slide guide 190 and the second slide guide 200. Or the stopper 204 and the cushioning member 205 can be disposed at a location other than (independently from) the first slide guide 190 and the second slide guide 200.

(Characteristic of the Battery Mounting)

As explained above, according to the representative embodiment, the output shaft 213 which tends to be the largest size among the component elements of the motor 210 is disposed to extend in the third direction D3 which corresponds to the thickness direction of the striking tool 100, as is shown from FIG. 4 to FIG. 7.

Further, instead of allocating the large sized component element of the motor 210 to the third direction D3, the expanded space S is largely secured along the second direction D2 which corresponds to the width direction of the striking tool 100. And such largely secured expanded pace S is used for the disposition of another functional members. Namely, as shown in FIG. 1 and FIG. 4, a space for another functional members is relatively largely secured at the side region 114 of the first housing 110 in the second direction D2.

According to the representative embodiment, the battery 150 which is a relatively heavy element can be closest to the center of gravity of the striking tool 100 in the second direction D2 (the center of gravity is located at the central axis along the first direction D1). Therefore, unnecessary moment of couple can be prevented as much as possible.

In addition, because the battery mounting direction 156 is set along the third direction D3 (see FIG. 3), the mounting operation of the battery 150 to the battery mounting portion 123 can be easily done by utilizing the expanded space S without any work in a narrow space.

Further, because the battery mounting direction 156 is set along the third direction D2, the battery mounting direction 156 intersects the first direction D1 I in which the vibration during the striking operation tends to be exerted. As a result, the battery 150 can be prevented from unintentionally being dropped out dur to any external force caused by the vibration.

Further, as shown in FIG. 1, a pair of the battery mounting portions 123, 123 are respectively provided at the region right below the handle 130A. Therefore, the user of the striking tool 100 can hold the handle 130 by one hand and mounts the battery 150 by using other hand and then changing hands, the user can hold the handle 130 by the latter hand and mount the other battery 150 by the former hand. As a result, cooperation of holding the handle 130 and mounting of the battery 150 can be improved.

(Characteristic of Detection Certainty by the Detection Mechanism 290)

As shown from FIG. 10 to FIG. 13, from FIG. 18 to FIG. 20, the detection mechanism 290 is arranged to be an assemble body and integrally attached to the controller case 270 as a component member of the second housing 120 side via the detection mechanism mounting portion 274.

The detection mechanism 290 is a member to detect the relative movement between the first housing 110 and the second housing 120. Therefore, in general, it is usual that some parts of the detection mechanism 290 are attached to the first housing 110 and remaining parts of the detection mechanism 290 are attached to the second housing 120. On the other hand, according to the representative embodiment, the detection mechanism 290 is entirely attached to the second housing 120 and then, the function of a working medium to the movable member 292 is allocated to the duct cover 220 as the component element of the first housing 110.

Therefore, members of the detection mechanism 290 can be disposed at the first housing 110 side as an assembly body, any malfunction of the detection mechanism 290 and resultant detection uncertainty due to the assembling error can be securely prevented.

Further, as shown in FIG. 19 and FIG. 20, the clearance 290CL is formed between the duct cover 220 as the working medium to the movable member 292 and the detection mechanism 290, assembling error of the first housing 110 and the second housing 120 can be absorbed and any malfunction and detection uncertainty can be prevented.

Further, as is explained above, the detection mechanism 290 defines the device to switch between the soft non-loaded driving state and the loaded driving state. Besides that, it may possibly happen during the striking operation that the pushing force of the user temporally decreases due to any accidental circumstances such like a change of the holding posture and/or a change of direction of the striking tool 100 (inclination angel to the first direction D1).

In such a case, it is not practical to switch the loaded driving state to the soft non-loaded driving state at each time based on the fact that the pushing force of the user is decreased. Therefore, according to the representative embodiment, even when the pushing force of the user decreases during the striking operation, switching to the soft non-loaded driving state is prohibited and loaded driving state is maintained till predetermined time passes (1 second for example). As a result, practicality for the striking operation can be enhanced.

Further, it is conceivable to adopt an embodiment such that the pushing operation is detected based on the change of the load current of the motor 210 and then, the soft non-loaded driving state is switched to the loaded driving state. However, with respect to the large hammer characterized by the large output, the load current may possibly be varied and precise detection may possibly be hindered.

In this respect, the representative embodiment utilizes the movable member 292 biased by the movable member biasing elastic body 293 as a mechanical detection device and therefore, detection certainty can be secured.

(Character of the Controller Case 270)

In the striking tool 100 according to the representative embodiment, as shown in FIG. 7, FIG. 10, FIG. 11 and so on, the controller 260 for controlling the motor 210 is held by the controller case 270.

The controller case 270 of this representative embodiment has the following aspects:

(1) The controller case 270 holds not only the controller 260 but also various functional member(s) 280. Therefore, device structure and assembling process can be rationalized and eased and entire construction of the striking tool 100 can become compact.

(2) The controller case 270 is mainly formed by the frame 271 and therefore, light weight and high rigidity structure can be realized.

(3) The controller case 270 is disposed at the second housing 120 as a vibration reduced side and therefore, vibration generated at the first housing 110 side can be prevented from being transmitted to the controller case 270.

(4) The controller case 270 is disposed right upper region over the motor 210. Therefore, electric harness (electric wire) can easily be deployed.

(5) The controller case 270 is disposed on the central line in the first direction D1 and therefore, the electric harness (electric wire) can be deployed symmetrically in the second direction D2 (width direction) and in the third direction D3 (thickness direction). As a result, product design and assembling can be eased.

(6) According to the representative embodiment, blushless motor is adopted for having large output and downsizing and the output shaft 213 of the motor 210 extends in the third direction D3 such that the expanded space S is formed at the side region 114. In addition to these aspects, the controller case 270 is disposed right upper region over the motor 210 and therefore, the expanded space S can be easily used for deploying the electric wire harness. As a result, efficiency of utilizing the inner space of the striking tool 100 can be increased.

(Characteristics of Cooling Capability for the Motor 210 and the Controller 260)

With respect to the cooling air supplying route to the members in the striking tool 100 which are required to be cooled by utilizing the axial flowing of the cooling fan 214 of the motor 210, the controller 260 is cooled and then, the motor 210 is cooled via: [the cooling air intake port 127]-[inside of the head case 121]-[the controller 260]-[the first end portion 232 of the duct hose 231]-[the duct hose 231]-[the second endo portion 233 of the duct hose 231]-[duct cover 220]-[inside the motor housing 215]

Further, the cooling air which cooled the motor 210 cools the motion converting mechanism 170 and the striking mechanism 180 (in part) via [the upper side drive mechanism housing part 111] and [the lower side drive mechanism housing part 112]. And then, the cooling air is exhausted to the outside of the striking tool 100.

Note that the cooling air passage at the downstream side from the motor 210 is not shown in drawings for the sake of convenience.

Moreover, the striking tool 100 has characteristics regarding the cooling capability to the component element as follows:

(1) The duct hose 231 is provided with a member which generates biasing force to compress the duct hose 231 when the duct hose 231 is stretched from the predetermined initial state. And the duct hose 231 is disposed to connect the first housing 110 and the second housing 120 in a state that the duct hose 231 is stretched in advance. Therefore, when the first housing 110 and the second housing 120 relatively move, the duct hose 231 is prevented from coming loose and from being rubbed to wear against other component members. Further, the duct hose 231 is prevented from being twisted and from being too much tensioned. As a result, the cooling air can effectively be transferred between members relatively moving to each other.

(2) As shown in FIG. 11, FIG. 16 and FIG. 17, the cross section of the first end portion 232 and the cross section of the second end portion 233 respective intersect. Therefore, as well as the above-explained (1), the duct hose 231 can be avoided from being twisted or unfavorably tensioned when the first housing 110 and the second housing 120 relatively move to each other.

(3) As shown in FIG. 16, the first end portion 232 and the second end portion 233 are direct and fittingly connected to the duct member mounting portion 272 of the controller case 270 and to the duct member mounting portion 225 of the duct cover 220, respectively. Namely, an adapter non-intervening structure is adopted and the construction of the striking tool 100 can be simplified.

(4) As shown in FIG. 16, the first end portion 232 of the duct hose 231 is disposed in the vicinity of the upper region of the cooling fan 214 of the motor 210. As a result, the duct hose 231 can be prevented from having unnecessarily long size. Further, the duct hose 231 can be prevented from being too short and resultantly being unfavorably tensioned.

(5) As shown in FIG. 16, the cooling air intake port 127A is at least disposed corresponding to the end portion opposing to the duct member mounting portion 272 of the controller case 270.

Further, in the representative embodiment, the cooling air intake port is provided entirely over the top surface of the head case 121.

As a result, the cooling air led into the striking tool 100 can entirely cool the controller 260 and thus, cooling efficiency can be increased.

(6) As shown in FIG. 11, the duct hose 231 is curved around at the central region by the duct member guide rib 116 of the motor housing 215. Thereby, the mounting shape of the duct hose 231 (substantially L-shape) can be maintained even when the first housing 110 and the second housing 120 relatively move to each other. As a result, duct hose 231 can be prevented from being twisted and from unnecessarily be tensioned.

(Modification of the Handle 130)

According the striking tool 100, as is shown in FIG. 3 and so on, while the first handle member 131 and the second handle member 141 are provided in bar-shape to respectively comprise the free end regions 134, 144, these structures can be modified.

Figure 21:
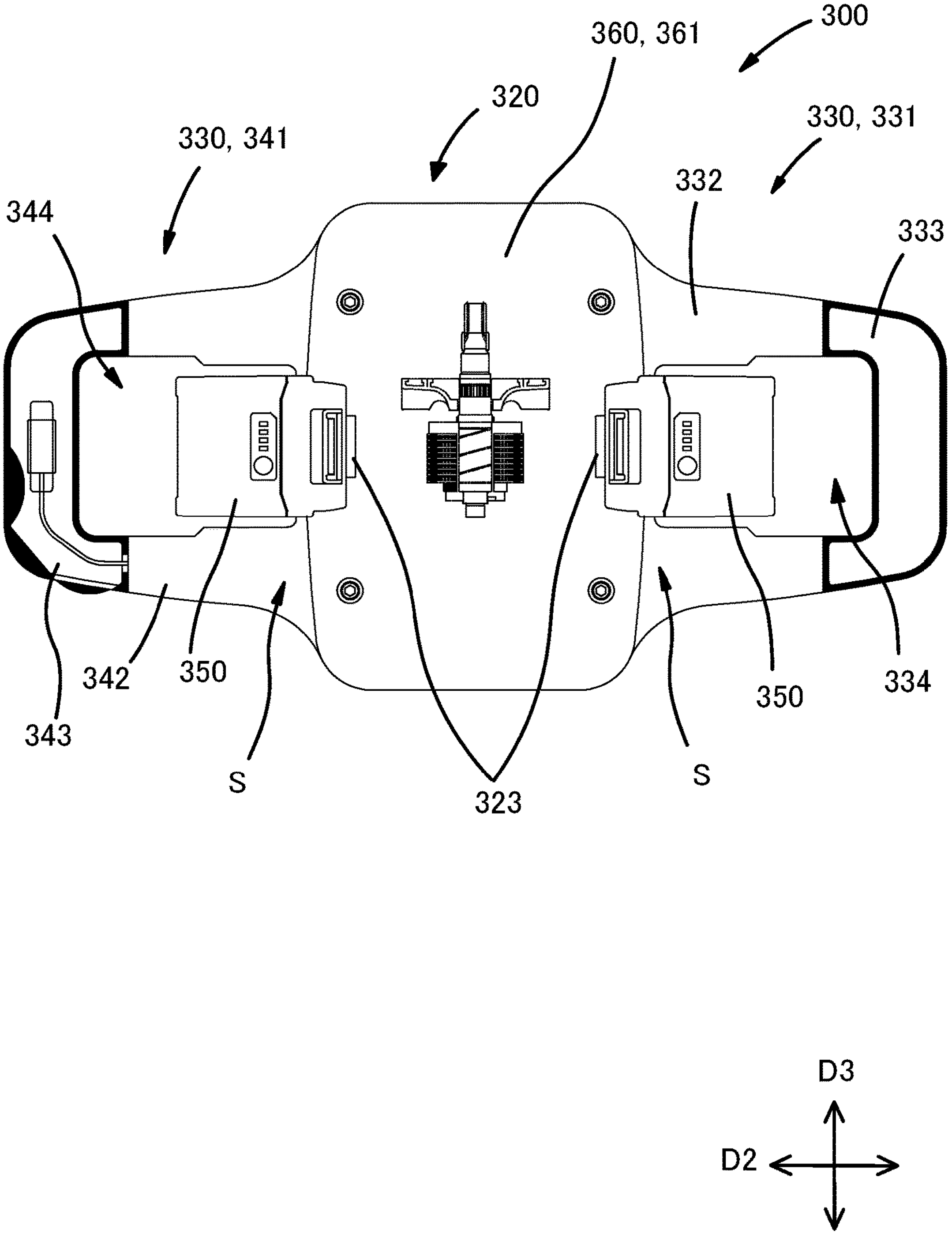
FIG. 21 shows a schematic plane view showing a modification of the striking tool according to the representative embodiment.
Figure 22:
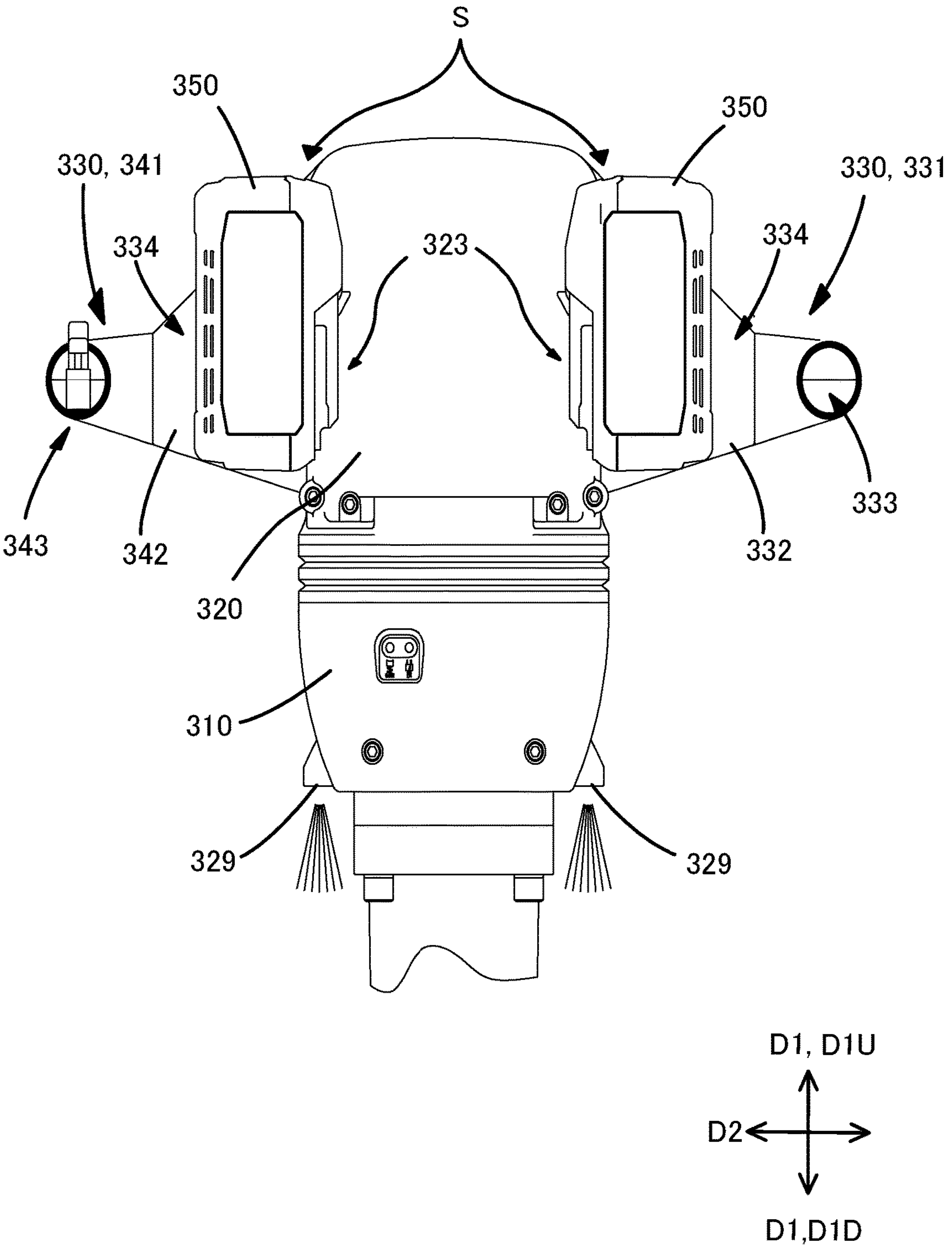
FIG. 22 shows a front view showing the modification of the striking tool according to the representative embodiment.

As shown in FIG. 21 and FIG. 22, the striking tool 300 according to the modification comprises a first housing 310 and a vibration reduction typed second housing 320 relatively movably connected to the first housing 310 in the first direction D1. Further, a first handle member 331 and the second handle member 341 are provided with the second housing 320 as a handle 330 extending in the second direction D2.

The first handle portion 331 and the second handle portion 341 respectively comprise handle grip portions 333 and 343, handle base portions 332 and 342 which connect respective end portions of the handle grip portions 333 and 343 with the second housing 320.

The first handle portion 331 and the second handle portion 341 are, when viewed in the first direction D1, formed in ring shape (loop shape) to comprise a closed space portions 334 and 344 between the second housing 320 with respect to the second direction D1 and the third direction D3.

Further, both at the side face regions of the second housing 320, battery mounting portions 323 are respectively provided at the height in the first direction D1 to face the closed space portion 334 and 344.

In FIG. 21 and FIG. 22, a state is shown in which batteries 350, 350 are respectively mounted to the battery mounting portions 323, 323.

In this state, batteries 350, 350 are provided to be surrounded by the closed space portions 334 and 344 with respect to the faces formed by the second direction D2 and the third direction D3. Namely, the first handle portion 331 and the second handle portion 341 are for user's gripping and also for battery protectors from external force.

Note that in the striking tool 300 according to the modification also comprises a LED light 329 to contribute the improvement of visibility during the striking operation.

Further, as shown in FIG. 21, an output shaft 361 of the motor 360 is disposed to extend in the third direction D3 according to the modification.

Therefore, the large sized output shaft 361 is allocated to the third direction D3, a relatively large sized expanded space S can be provided to the second direction D2 side.

In the modification of the representative embodiment, batteries 350, 350 can be mounted to the battery mounting portions 323 by utilizing the expanded space S, rational disposition of the component members can be improved.

According to the representative embodiment and its modification, a structuring technique which contributes to the rationalization of dispositioning parts and operability with respect to a striking tool 100 in which usual operation is defined as a striking operation to the downward in a state that the striking tool is downwardly dropped by the own weight of the striking tool 100.

According to the cordless type large hammer, if the high efficiency is sought by increasing the output, secured measure is necessarily required for such strong vibration generated as a trade-off for the output increase.

In this regard, while some measures are realized, the vibration reduction is quite important for protecting the functional members equipped to the striking tool and for reducing user's burden. Therefore, further rationalization is highly required.

Having regard to this point, following aspects are provided.

A-1

A striking tool comprising;

an elongated main housing having a tool holder at the front end of the main housing and a pair of handles, wherein, when a first direction is defined by a longitudinal direction of the main housing and a second direction is defined by a direction crossing the first direction, each of the handles extends in the second direction, wherein usual operation of the striking tool is defined as a striking operation to the downward by an end tool detachably attached to the tool holder, in a state that the user of the striking tool holds the handle and the striking tool is downwardly dropped by the own weight of the striking tool, the striking tool further comprising;

a drive mechanism which drives the end tool in the first direction, a motor having an output shaft to drive the drive mechanism, a first housing and a second housing respectively defining component elements of the main housing, and an elastic member disposed between the first housing and the second housing, wherein the drive mechanism and the motor are disposed at the first housing, the pair of handles are disposed at the second housing, the second housing is, together with the pair of handles, relatively movable to the first housing by means of the elastic member, wherein slide guide members to guide the relative movement between the first housing and the second housing are respectively disposed at a plurality of points in the first direction.

Due to the slide guide by using the plurality of slide guide members in the first direction, any force in the direction other than the first direction can be prevented from being exerted with respect to the relative movement between the first housing and the second housing. As a result, stable and smooth relative movement can be secured.

A-2

In A-1, the elastic member is disposed between the plurality of slide guide members in the first direction.

A-3

In A-1 or A-2, the slide guide members are further disposed at plural points around the first direction.

By such a construction, in addition to the A1, further stable vibration reduction can be made. Note that the "disposition between" may preferably embrace an aspect that the elastic element is disposed in the first direction as separated by distance from the plurality of slide guide members, and an aspect that the elastic element is disposed in the first direction partly overlapping with the slide guide member(s).

A-4

In A-1 to A-3, the plural slide guide members comprise a handle near side slide guide member and a handle remote side slide guide member remoter from the handle than the handle near side slide guide with respect to the first direction, wherein, the handle near side slide guide member comprises metal component element disposed at one of the first housing and the second housing, and a resin component element disposed at the other of the first housing and the second housing to relatively slide to the metal component element.

By disposing one of slide guide members near the handle which is pushing and held by the user, vibration during the striking operation can effectively be further alleviated. As a result, stable vibration reduction can be realized. And, by adopting a metal component element and a resin component element for the handle near side slide guide member, necessary strength for the slide guiding can be secured, while weight reduction can also be realized.

A-5

In A-4, the metal component element is provided with a pipe shaped member the circumferential direction of which is defined as around the first direction, and the resin component element is provided with a bifurcated member disposed at the second housing to contact with the pipe shaped member as the metal component element.

By utilizing a pipe shaped member, the strength and the durability of the slide guide member can further be enhanced. The pipe shaped member may preferably be formed in a hollow shape in order to provide with further strength. Note the pipe shaped member is enough to have at least an arc part. For example, arch shape as viewed in the first direction can be adopted. The bifurcated member may be defined by as a fork shaped member or a branched shaped member.

A-6

In A-4 or A-5, the handle remote side slide guide member comprise a convex member disposed at one of the first housing and the second housing to project in the first direction and a concave member disposed at the other of the first housing and the second housing to be engaged with the convex member.

By adopting the convex concave structure, the strength and the durability of the slide guide member can be enhanced. Further, any force having component other than the slide guide direction can be prevented from being adversely exerted.

A-7

In A-6, at least one of the convex member and the concave member is provided with a sheet metal slide guide in a intervening manner.

By this construction, the strength and the durability of the slide guide member can further be enhanced. Note that the sheet metal slide guide is enough to be disposed in a intervening manner and it can be coupled to the first housing or to the second housing.

A-8

In A-1 to A-7, a stopper is provided to define a maximum movable distance of the relative movement of the second housing to the first housing with respect to the first direction.

By this construction, an adverse event, for example, such that strong vibration is imputed to increase the relative movement between the first housing and the second housing and resultantly to cause direct contact between the first housing and the second housing (namely, "bottom hit") can be efficiently prevented.

A-9

In A-8, a cushioning member is provided to cushion the relative movement of the second housing when the second housing relatively moves to the first housing by a predetermined distance shorter than the maximum movable distance.

The cushioning member may preferably contiguously perform cushioning function from the predetermined distance till to the maximum movable distance.

By this construction, the relative movement between the first housing and the second housing can be received with cushioning effect to be guided to the maximum movable distance by the stopper. As a result, the durability of the slide guide can be enhanced and the vibration reduction characteristic and the operation quality can be enhanced.

A-10

In A-1 to A-9, in a case that the elastic member is defined as a first elastic member, a second elastic member is provided separate from the first elastic member to intervene between the first housing and the second housing for an initial action, Wherein, in a case that the second housing relatively moves to the first housing by a predetermined initial action distance, the biasing member of the second elastic member is exerted.

A-11

In A-10, in a case that the second housing relatively moves to the first housing over the initial action distance, both the biasing force of the first elastic member and the biasing force of the second elastic member are exerted.

It is preferable to set the elastic coefficient of the second elastic member to be smaller than the elastic coefficient of the first elastic member such that the first elastic member is for the initial action and the second elastic member is for the vibration reduction. Thus, each characteristic and role can be more clearly distinguished.

For example, in the first action in which the second housing is pushed to the first housing, the biasing force of the second elastic member is exerted. As a result, the initial action can be detected by utilizing the biasing force of the second elastic element. On the other hand, when the striking operation is fully performed, the biasing force of the first elastic member may effectively be exerted between the first housing and the second housing. Thus, the characteristic and the role of the vibration reduction can be allocated to the first elastic member, while the initial action detection to the second elastic member. As a result, the device structure can be further rationalized and the operability can further be enhanced.

A-12

In A-11, the second elastic member is disposed at the upper side in the first direction when the direction from the handle to the tool holder is defined as the lower side, and the direction from the tool holder to the handle is defined as the upper side.

By such construction, the second elastic member which works reflecting the user's operation can be disposed to close to the user. On the other hand, the first elastic member which works for the vibration reduction can be disposed to close to the vibration source. Thus, disposition in accordance with each function can be realized.

A-13

In A-1 to A-12, the second housing is provided with a battery mounting portion to which a battery for supplying electricity to the motor is attachable, and a battery protector for protecting at least a part of the outer shape of the battery from external force.

By such construction, the battery can be disposed to the second housing side to which the vibration from the first housing can be prevented to be transmitted. Thus, the outer of the battery can be further protected from the external force and protectability of the battery and the battery mounting portion can further be enhanced.

EXPLANATION OF THE REFERENCES

100 Striking tool
110 First housing (main housing)
111 Upper-side drive mechanism housing part
112 Lower-side drive mechanism housing part
113 Front end region
114 Side region
115 Motor housing
116 Duct member guide rib
120 Second housing (main housing)
120A first elastic member mounting base
120B Second elastic member mounting base
120*c* Pushing base
121 Head case
122 Handle mounting portion
123 Battery mounting portion
124 Slide guide
125 Electricity supply terminal

126 Cushioning member contact base
127 Cooling air intake port
128 Battery protector
129 LED light
130 Handle
130A Region right below the handle (Handle right below region)
131 First handle member (Handle R)
132 First handle base portion
133 First handle grip portion
134 Free end region
135 Trigger
136 Electric switch
141 Second handle member (handle L)
142 Second handle base portion
143 Second handle grip portion
144 Free end region
330 Handle (according to the another embodiment)
310 First housing
320 Second housing
323 Battery mounting portion
329 LED light
331 First handle member
332 Handle base portion
333 Handle grip portion
334 (Closed) Space portion 334
341 Second handle member
342 Handle base portion
343 Handle grip portion
344 (Closed) Space portion 344
350 Battery
360 Motor
361 Output shaft
150 Battery
151 Battery front face portion
152 Battery upper face portion
153 Battery bottom face portion
154 Battery rear face portion
155 Lock release portion (Unlock portion)
156 Battery mounting direction
161 First elastic member
162 Second elastic member
170 Motion converting mechanism
171 First intermediate shaft
172 Second intermediate shaft
173 Crank mechanism
174 Cylinder
174A Ventilation hole
175 Piston
176 Air chamber
177 Vibration reducing mechanism
178 Counter weight
180 Striking mechanism
181 Striker
182 Impact Bolt
190 First slide guide member (handle near side slide guide member)
191 Pipe shaped member (First housing side component element)
192 Bifurcated member (Second housing side component element)
190CL Clearance
200 Second slide guide member (handle remote side slide guide member)
201 Convex member
202 Concave member
203 Sheet metal slide guide
204 Stopper
205 Cushioning member
210 Motor
211 Stator
212 Rotor
213 Output shaft
214 Cooling fan
215 Motor housing
220 Duct cover
221 Inner space
222 Motor mounting base
223 Flange
224 Cooling air guide passage
225 Duct member mounting portion
230 Duct member
231 Duct hose
232 First end portion
233 Second end portion
240 Tool holder
250 Retainer
260 Controller
261 Heat dissipation fin
270 Controller case
271 Frame
272 Duct member mounting portion 272
273 Head case mounting portion 273
274 Detection mechanism mounting portion
275 Main electric switch mounting portion
276 Communication unit mounting portion
277 Wire harness insertion opening
278 Second elastic member mounting portion
280 Functional member
281 Main electric switch
282 Communication unit
290 Detection mechanism
291 Assembly body main part
292 Movable member
293 Movable member biasing elastic body
294 sensor
290CL Clearance
D1: First direction (Longitudinal direction)
D1D: First direction lower side
D1U: First direction upper side
D2: Second direction (width direction)
D3: Third direction (Thickness direction)
AX: Longitudinal axis
HL: Virtual line
MS: Initial action distance
S: Expanded space

The invention claimed is:

1. A striking tool comprising:

an elongated main housing (i) having a longitudinal axis extending in a first direction, which defines an up-down direction of the striking tool, and (ii) including a tool holder at a lower end of the main housing, the tool holder being configured to detachably hold an end tool;

a pair of handles each extending from the main housing in a second direction crossing the first direction;

a drive mechanism which drives the end tool in the first direction;

a motor having an output shaft to drive the drive mechanism; and a slide guide that is slidably engageable with a battery for supplying electricity to the motor, wherein:

the output shaft of the motor extends in a third direction crossing both the first direction and the second direction;

the slide guide is provided at a portion that protrudes from the main housing in the second direction and at a position where the slide guide (i) overlaps with the pair of handles as viewed in the first direction but (ii) is spaced apart from the pair of handles in the first direction so as to define a gap in the first direction between the slide guide and the pair of handles; and the battery is engageable with the slide guide so as to be disposed at a lower side of the slide guide and so that a topmost surface of the battery (i) is parallel to a virtual plane formed by the second and third directions, (ii) faces the slide guide, and (iii) is parallel to an extension direction of the pair of handles.

2. The striking tool according to claim 1, wherein two of the slide guides are provided and each of the slide guides is disposed at a respective side of the main housing in the second direction.

3. The striking tool according to claim 1, wherein an outer shape of the battery is inside a virtual line which connects a free end region of one of the pair of handles and the lower end of the main housing in a state that the battery is engaged with the slide guide.

4. The striking tool according to claim 1, wherein the slide guide is configured to slidably engage with the battery that is slid in the third direction.

5. The striking tool according to claim 1, wherein the drive mechanism comprises a motion converting mechanism which converts a rotational movement of the output shaft to a linear movement in the first direction, wherein a straight line extending in the second direction intersects the slide guide and the motion converting mechanism, and wherein the motion converting mechanism is disposed in the main housing on an opposite side of the longitudinal axis of the main housing in the third direction from a user of the striking tool who holds the pair of handles.

6. The striking tool according to claim 1, further comprising:

a cover that partially covers the battery which is engaged with the slide guide, wherein:

the cover protrudes from the main housing in the second direction; and the slide guide is integrated with the cover.

7. The striking tool according to claim 6, wherein:

the cover is below the pair of handles such that a gap is formed between the pair of handles and the cover in the up-down direction.

8. The striking tool according to claim 1, further comprising:

a first housing and a second housing respectively defining component elements of the main housing, and an elastic member disposed between the first housing and the second housing, wherein the drive mechanism and the motor are disposed at the first housing, the pair of handles are disposed at the second housing, and the second housing is, together with the pair of handles, movable relative to the first housing by way of the elastic member, and wherein slide guide members for guiding the relative movement between the first housing and the second housing are respectively disposed at a plurality of points in the first direction.

9. The striking tool according to claim 1, wherein:

the main housing includes a first housing and a second housing connected to the first housing via an elastic member such that the second housing is movable relative to the first housing;

the drive mechanism and the motor are within the first housing;

the pair of handles are connected to the second housing to be movable together with the second housing relative to the first housing; and the portion to which the slide guide is provided protrudes from the second housing in the second direction.

10. The striking tool according to claim 1, wherein the slide guide is directly below one of the pair of handles in the up-down direction.

11. A striking tool comprising:

an elongated main housing (i) having a longitudinal axis extending in a first direction, which defines an up-down direction of the striking tool, and (ii) including a tool holder at a lower end of the main housing, the tool holder being configured to detachably hold an end tool;

a pair of handles each extending in a second direction crossing the first direction;

a drive mechanism configured to drive the end tool in the first direction;

a motor having an output shaft to drive the drive mechanism;

a slide guide that is slidably engageable with a battery for supplying electricity to the motor; and a cover that partially covers the battery when the battery is engaged with the slide guide, wherein:

the output shaft of the motor extends in a third direction crossing both the first direction and the second direction;

the cover protrudes from the main housing in the second direction;

the slide guide is integrated with the cover;

when the battery is engaged with the slide guide, the cover covers a surface of the battery opposite that which faces the slide guide;

the slide guide is configured to slidably engage with the battery that is slid in the third direction;

the cover has an opening such that the battery is slid in the third direction to be engaged with and disengaged from the slide guide through the opening; and an uppermost edge of the cover and the pair of handles are spaced apart from each other in the up-down direction.

12. The striking tool according to claim 11, wherein the cover and the slide guide are directly below the one of the pair of handles in the up-down direction.

13. The striking tool according to claim 11, wherein:

the main housing includes a first housing and a second housing connected to the first housing via an elastic member such that the second housing is movable relative to the first housing;

the drive mechanism and the motor are within the first housing;

the pair of handles are connected to the second housing to be movable together with the second housing relative to the first housing; and the cover protrudes from the second housing in the second direction.

14. The striking tool according to claim 11, wherein two of the slide guides and two of the covers are provided at respective sides of the main housing in the second direction.

15. The striking tool according to claim 11, wherein the battery and the pair of handles at least partially overlap with each other as viewed in the first direction.

* * * * *